United States Patent
Seike et al.

(10) Patent No.: US 6,243,576 B1
(45) Date of Patent: Jun. 5, 2001

(54) RADIO COMMUNICATION ANALYZER SUITED FOR MEASUREMENT OF PLURALITY OF TYPES OF DIGITAL COMMUNICATION SYSTEMS

(75) Inventors: Takashi Seike, Atsugi; Yuji Honma, Sagamihara; Takayuki Saito, Atsugi; Mamoru Akada, Kawasaki, all of (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/361,492

(22) Filed: Jul. 26, 1999

Related U.S. Application Data

(62) Division of application No. 08/823,525, filed on Mar. 24, 1997, now Pat. No. 6,112,067.

(30) Foreign Application Priority Data

Mar. 27, 1996 (JP) .................................... 8-072373
Mar. 19, 1997 (JP) .................................... 9-066539

(51) Int. Cl.[7] .................................... H04B 1/00
(52) U.S. Cl. .................... 455/423; 455/67.1; 455/418
(58) Field of Search .................... 455/67.1, 423, 455/552, 553, 418; 702/119, 120, 123

(56) References Cited

U.S. PATENT DOCUMENTS

| | | | |
|---|---|---|---|
| 5,732,330 | * 3/1998 | Andersone et al. | 455/553 |
| 5,854,978 | * 12/1998 | Heidari | 455/418 |
| 5,909,193 | * 6/1999 | Phillips et al. | 342/410 |
| 6,091,765 | * 6/1999 | Pietzold, III et al. | 375/219 |

FOREIGN PATENT DOCUMENTS

| | | | |
|---|---|---|---|
| H11-205406 | * 7/1999 | (JP) | H04L/29/06 |
| H11-274-997 | * 10/1999 | (JP) | H04B/7/26 |

* cited by examiner

*Primary Examiner*—Nguyen T. Vo
*Assistant Examiner*—Makoto Aoki
(74) *Attorney, Agent, or Firm*—Frishauf, Holtz, Goodman, Langer & Chick, P.C.

(57) ABSTRACT

A radio communication analyzer can test a radio device under test which corresponds to one of a plurality of types of digital communication systems in accordance with the digital communication system to which the radio device under test corresponds. The radio communication analyzer includes a modulation section, a demodulation section, a modulation/demodulation processing section, and a control section. The modulation section has a first rewritable memory, and converts modulation data indicating the contents of a first test signal to be transmitted to the radio device under test into a digital modulated signal by executing a program written in the first memory. The demodulation section has a second rewritable memory, and generates demodulated data from a second test signal received from the radio device under test by executing a program written in the second memory. The modulation/demodulation processing section has a third memory. The modulation/demodulation processing section generates data to be input to the modulation section and processes the demodulated data obtained by the demodulation section on the basis of a protocol for the digital communication system used by the radio device under test by executing a program written in the third memory. The control section reads out program data corresponding to the respective types of digital communication systems and stored in a storage unit and writes the program data in the first, second, and third memories.

11 Claims, 16 Drawing Sheets

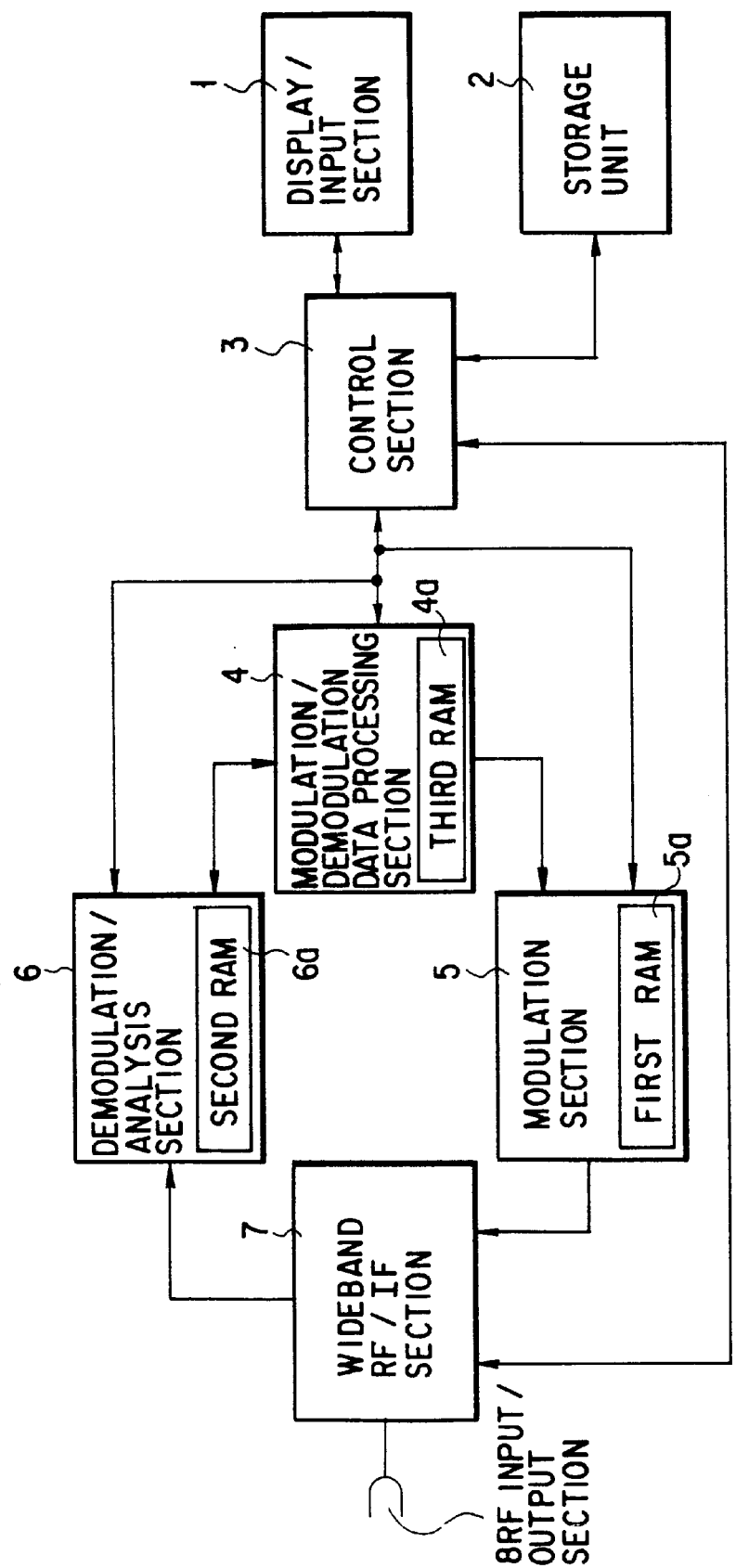
F I G. 1A

| | PDC | PHS | GSM |
|---|---|---|---|
| RF BAND | 800MHZ, 1.5GHZ | 1.9 GHZ | 900 MHZ |
| COMMUNICATION SCHEME | TIME DIVISION MULTIPLEX | TIME DIVISION MULTIPLEX | TIME DIVISION MULTIPLEX |
| TIME DIVISION CH | 3 | 4 | 8 |
| MODULATION METHOD | $\pi/4$ DQPSK (PHASE MODULATION) | $\pi/4$ DQPSK (PHASE MODULATION) | GMSK FREQUENCY MODULATION) |
| TRANSMISSION RATE | 42.0kbps | 384 kbps | 270.833kbps |
| FRAME PERIOD | 20ms | 5ms | 4.615ms |

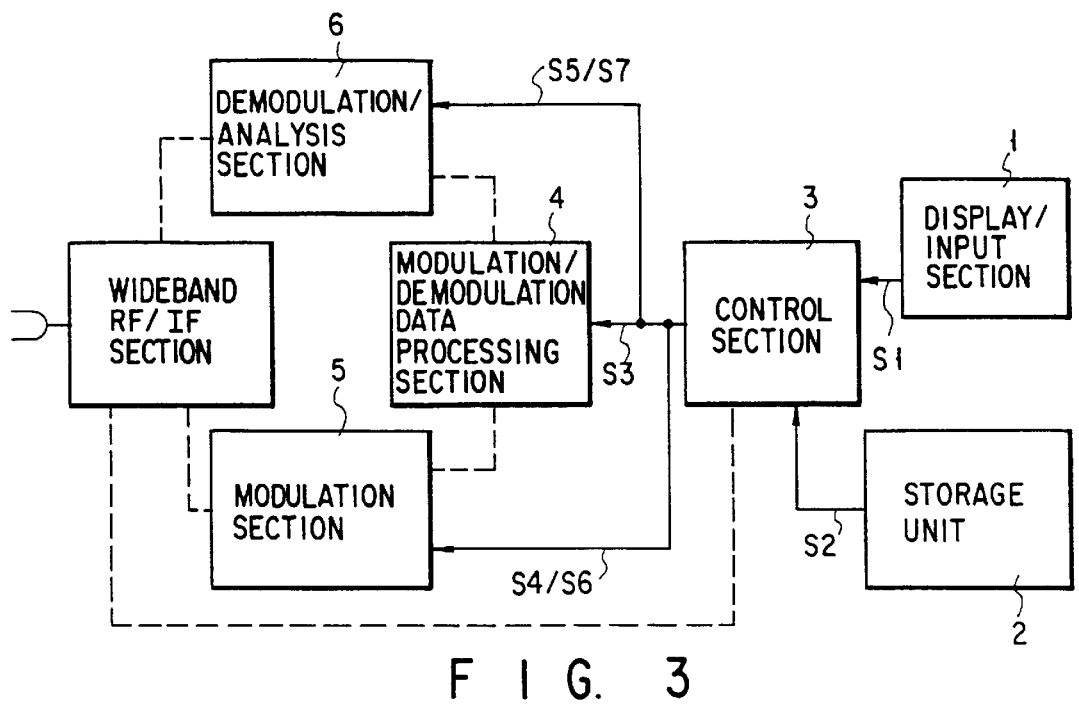
F I G. 3
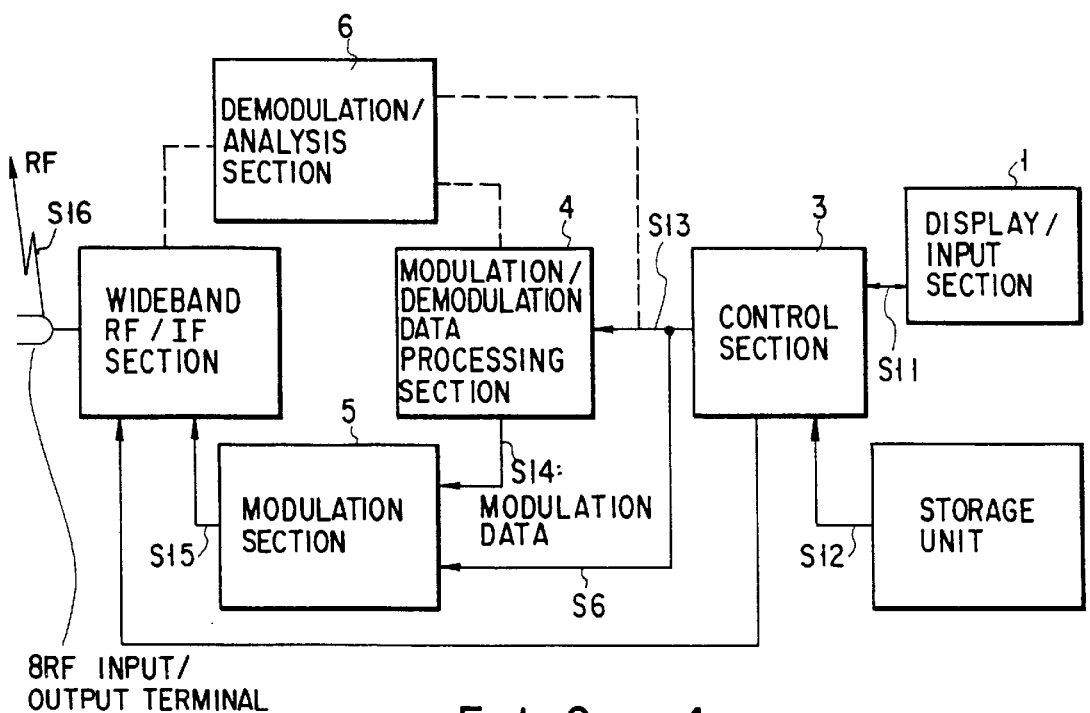
F I G. 4

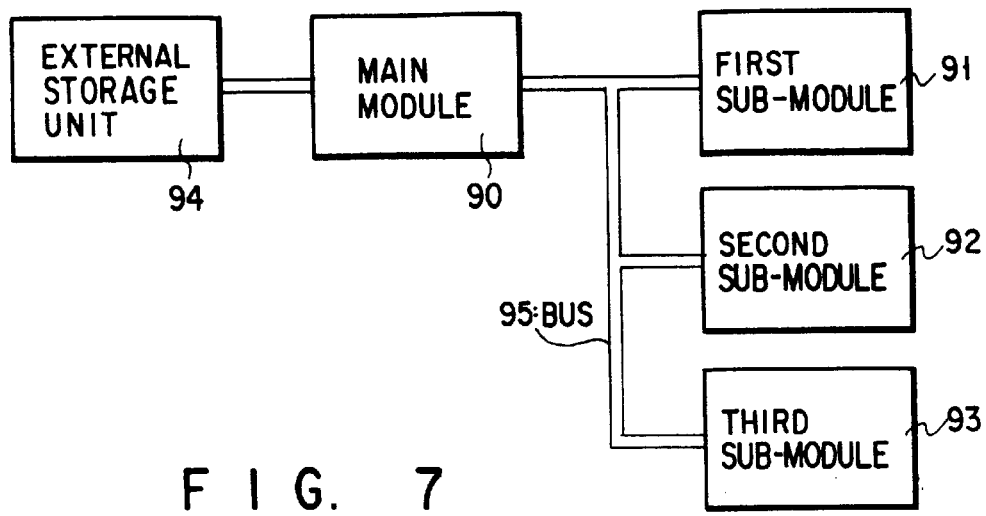
F I G. 7
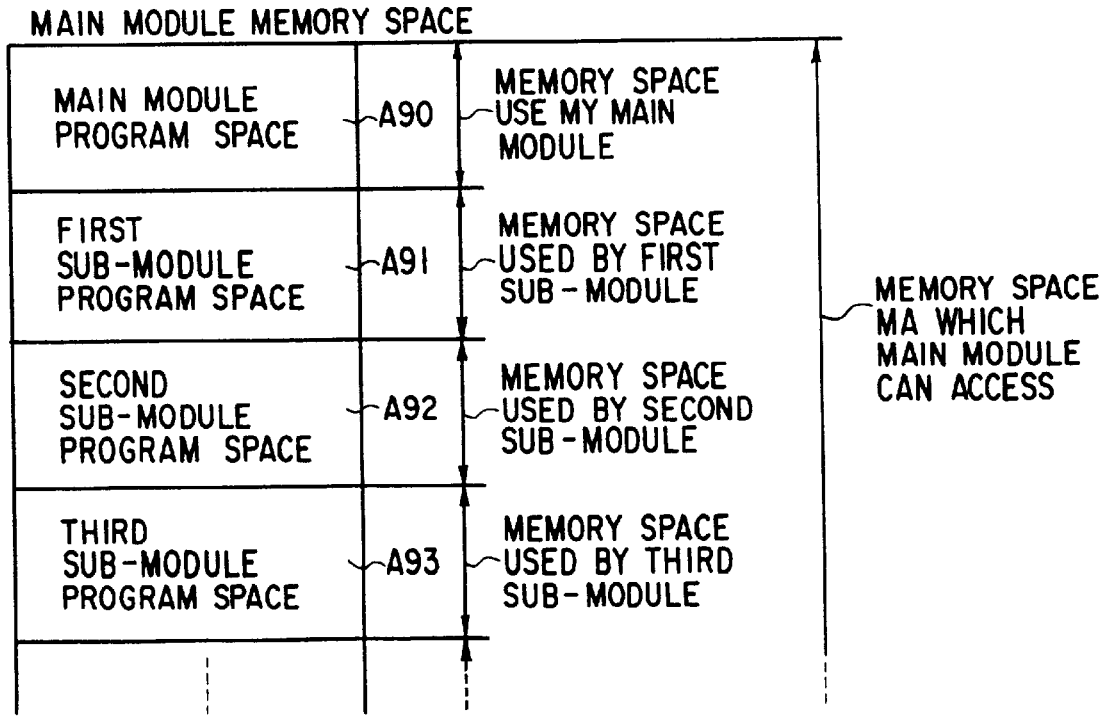
F I G. 8

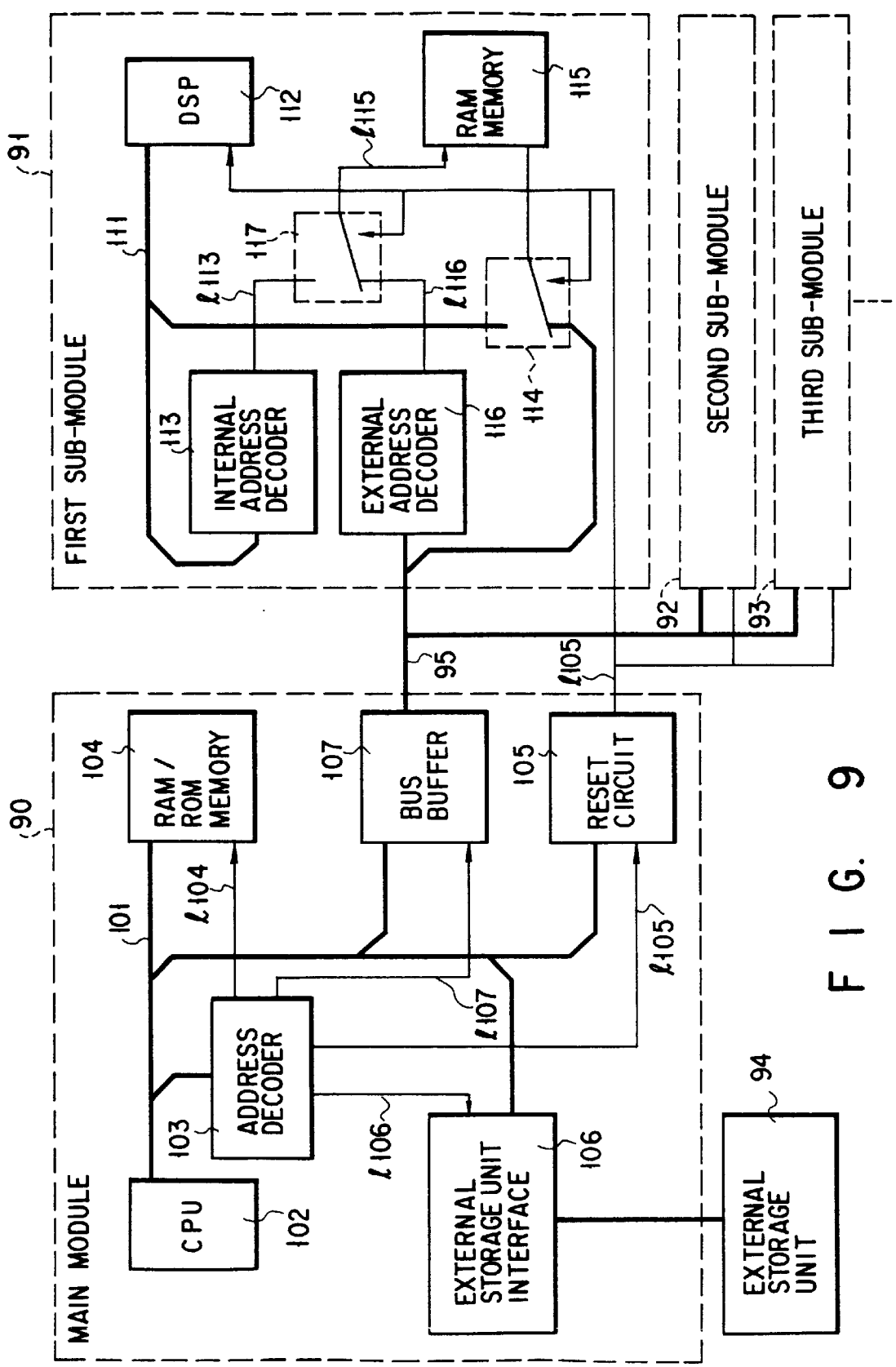
F I G. 9

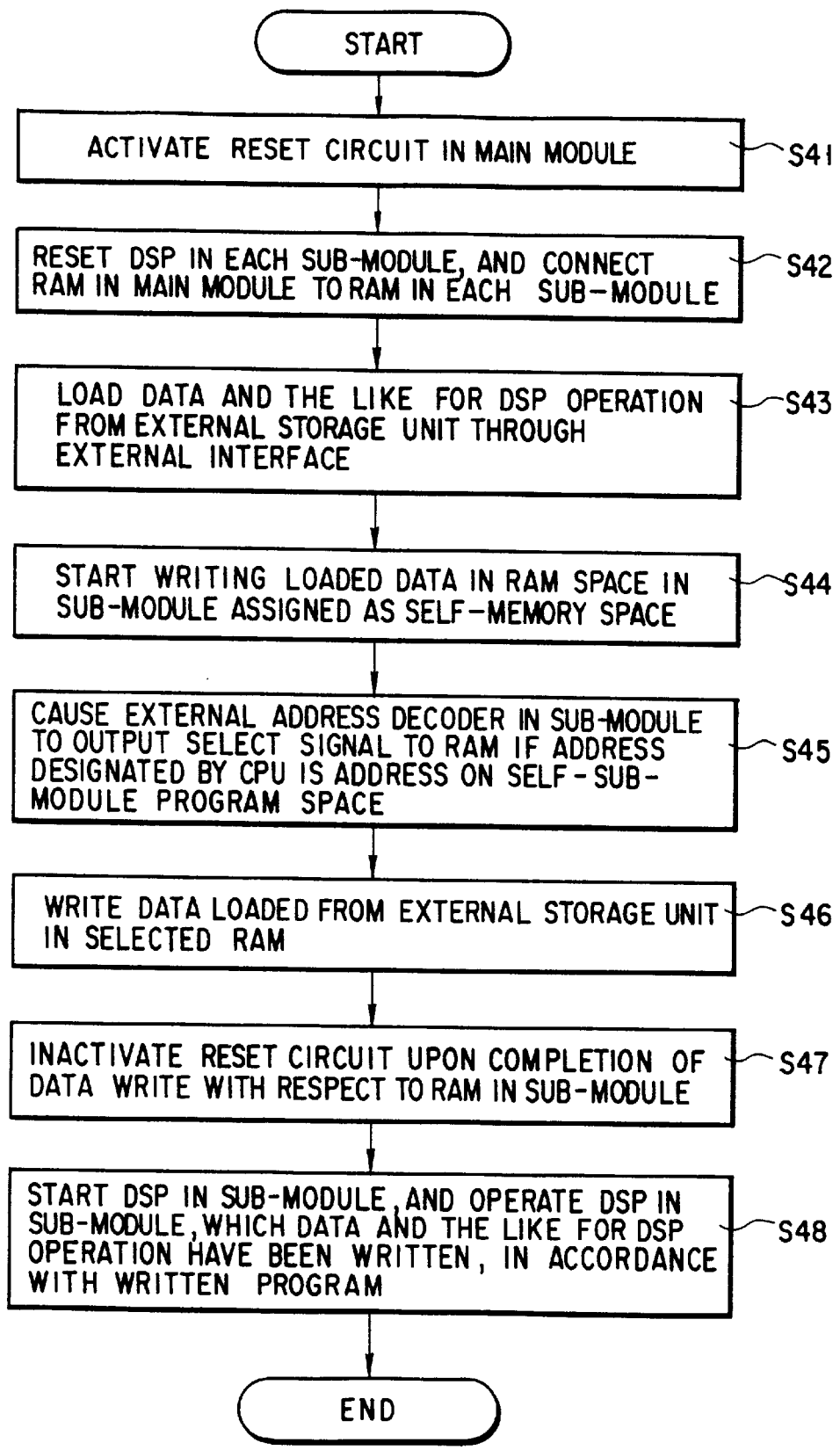
F I G. 10

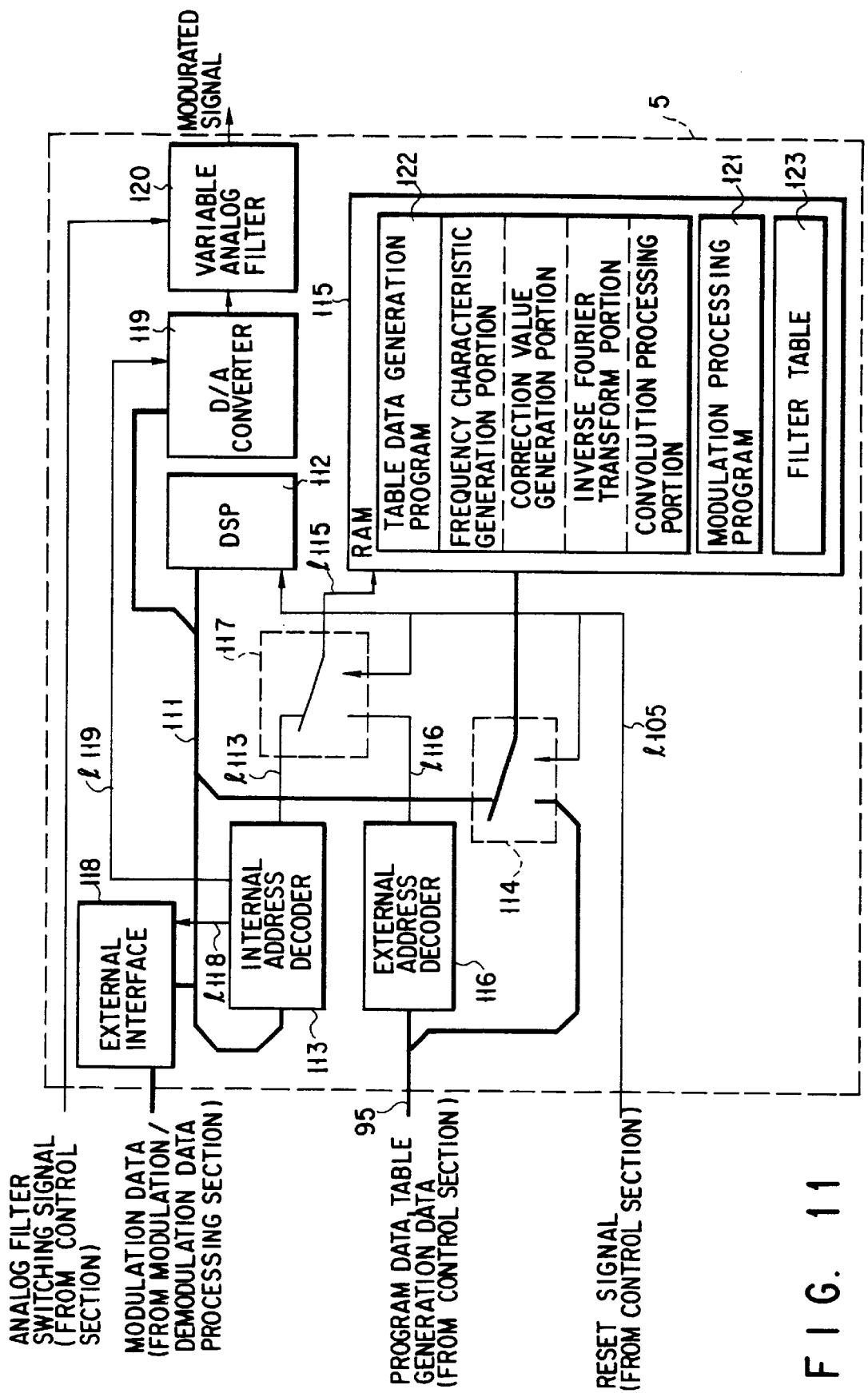
F I G. 11

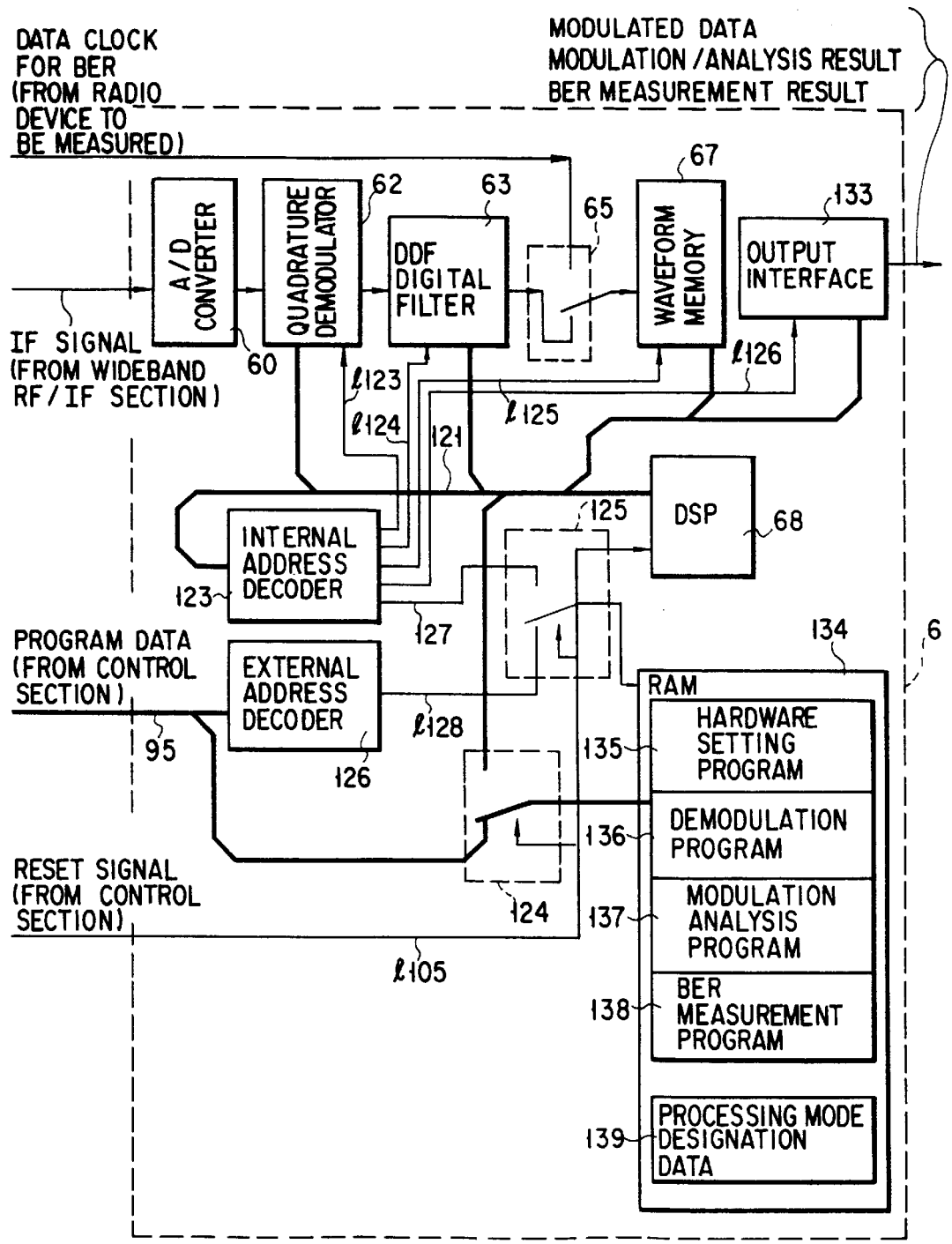
F I G. 12

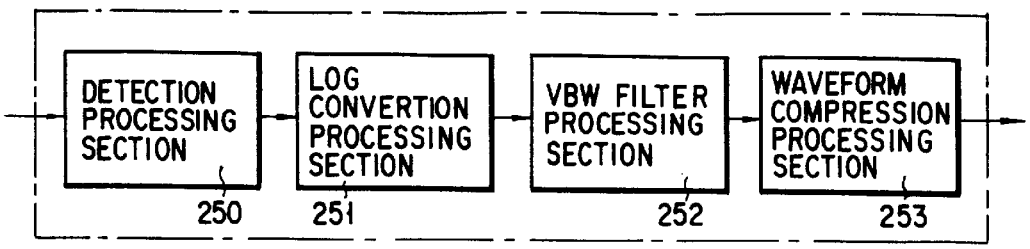
F I G. 14
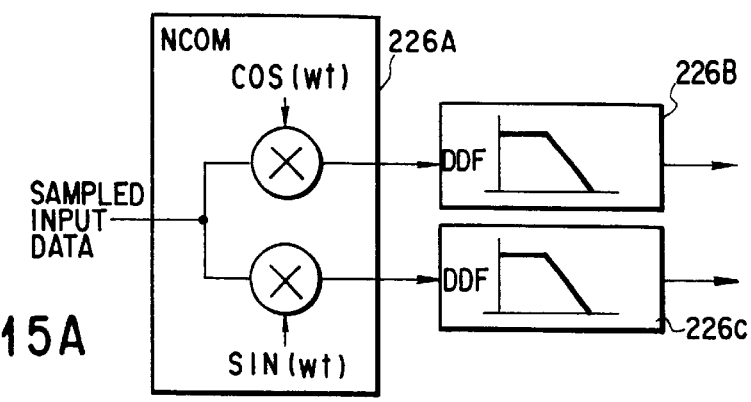
F I G. 15A
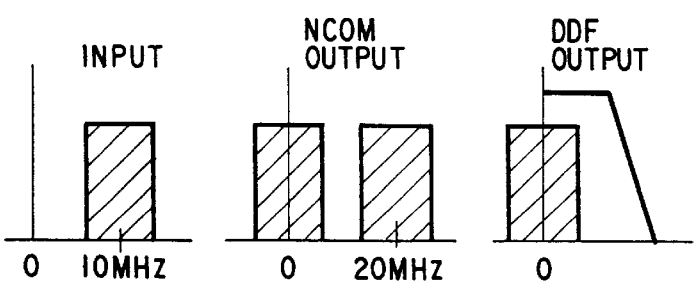
F I G. 15B
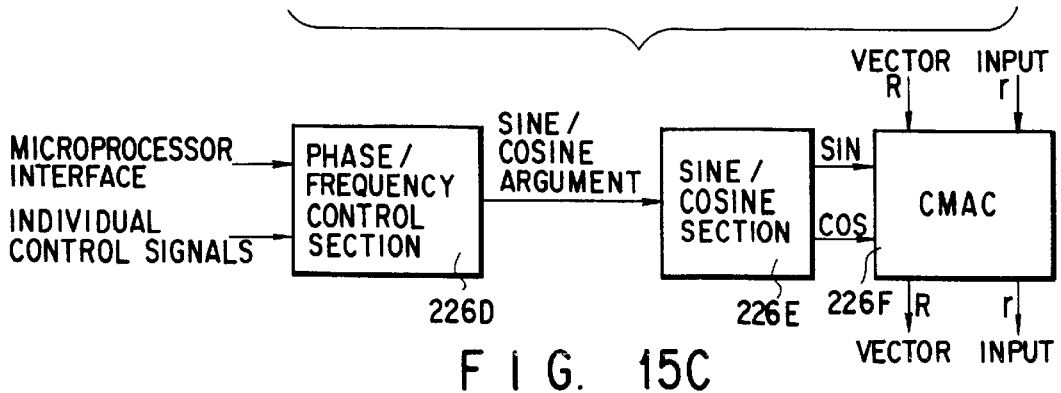
F I G. 15C

RADIO COMMUNICATION ANALYZER SUITED FOR MEASUREMENT OF PLURALITY OF TYPES OF DIGITAL COMMUNICATION SYSTEMS

This application is a division of Ser. No. 08/823,525 Mar. 24, 1997 U.S. Pat. No. 6,112,067.

BACKGROUND OF THE INVENTION

The present invention relates to a radio communication analyzer and, more specifically, a radio communication analyzer suited for measurement of a plurality of types of communication systems.

Recently, great efforts are being made to develop and put into practical use digital communication systems such as mobile communication systems using cordless and/or cellular telephones.

These communication systems are based on the specifications of various methods such as PDC, PHS, GSM, and CT-2. In these methods, digital data transmission is performed.

A radio communication analyzer obtained by modifying a conventional analog communication analyzer is used to test the transmission/reception characteristics of a radio device used in such a digital communication system.

Assume that each communication system operates in a digital form in testing the transmission/reception characteristics of a radio device by using this radio communication analyzer. In this case, since the respective methods use different modulation methods, different bit rates, and different data formats, it is difficult to cope with these communication method by only minor alterations of the conventional analog communication analyzer.

In order to use such a radio communication analyzer for measurement/test processes and the like in digital communication systems, a plurality of radio communication analyzers having dedicated hardware for the respective communication methods such as PDC and PHS may be prepared.

According to another method, digital circuits are replaced in the adaptor or board form in the analog communication analyzer for the respective communication methods, thereby coping with various communication systems.

A digital radio communication analyzer has a plurality of functions to perform various types of measurements on a digital communication system, and hence may be constituted by a plurality of blocks (modules).

In general, the respective modules independently execute various processes to ensure a high processing speed, and software such as programs and reference data must be installed to perform the processes.

Conventionally, such software is generally supplied using a ROM to allow the modules to quickly operate.

As described above, communication systems such as PDC and PHS are already in service domestically, and many different types of communication systems, including communication systems in foreign countries, are actually being used. Under the circumstances, demands have arisen for a radio communication analyzer capable of easily executing measurement of a plurality of types of digital communication systems alone.

Conventionally, however, the hardware must be replaced in accordance with each communication system. It is therefore difficult to easily and simply change the analyzer system for each type of digital communication system.

In various measuring apparatuses each constituted by a plurality of modules including a radio communication analyzer, ROMs are often used to easily supply software to the respective modules at high speed.

According to this method, however, it is difficult to ensure easy system modification of the measuring apparatus and its expandability.

In addition, as described above, mobile communication systems such as cellular telephone systems and cordless telephone systems use signals modulated by various methods, and also use TDMA (Time Division Multiple Access) to effectively use communication lines.

The frequency of a carrier for carrying a signal used in such a mobile communication system is high as several hundred MHz to several GHz.

In general, a spectrum analyzer is used to accurately measure various frequency components contained in such a signal.

FIG. 18 is a block diagram showing the schematic arrangement of a conventional spectrum analyzer for measuring the frequency characteristics of an RF signal to be measured like the one described above.

First of all, an RF signal a to be measured which is input through an input terminal 201 is adjusted to a predetermined level by an attenuator 202. The resultant signal is input to a frequency converter 203.

The RF signal a input to the frequency converter 203 is mixed with a local oscillation signal b from a local oscillator 205 by a signal mixer 204 to be converted into an IF signal having an intermediate frequency.

After the IF signal is band-limited by a bandpass filter (BPF) 206, it is re-mixed with a local oscillation signal $b_1$ from a local oscillator 208 by a signal mixer 207 to obtain a final IF signal, which is output from the frequency converter 203.

The oscillation frequency of the frequency converter 203 is swept within a predetermined frequency range by a sweep section controller 209.

As a result, a frequency $f_I$ of an IF signal c output from the frequency converter 203 also changes in synchronism with the sweep operation.

The IF signal c whose frequency is decreased and which is output from the frequency converter 203 is input to an RBW filter 210.

The RBW filter 210 uses a band-pass filter having frequency characteristics like those shown in FIG. 19. The RBW filter 210 removes unnecessary frequency components and selects only a necessary IF signal.

The bandwidth (RBW) at a level 3 dB below the peak level at a center frequency $f_C$ of the frequency characteristics of this band-pass filter, i.e., the RBW filter 210, represents the frequency resolution of this spectrum analyzer.

In addition, since the frequency $f_I$ of the IF signal c output from the frequency converter 203 changes in synchronism with the sweep operation, an output signal output from the RBW filter 210 with the lapse of time within one sweep period (sweep cycle) is the time series waveform of each frequency component of the signal to be tested which is converted into the IF signal c upon sweep reception.

The output signal from the RBW filter 210 is first gain-adjusted in an amplifier 211, and then logarithmically converted in a LOG converter 212.

The output signal whose signal level has been converted in dB by the LOG converter 212 is detected by a detector 213.

As a result, the signal detected within the sweep period indicates the size of the time series waveform of the sweep frequency.

If, therefore, the abscissa represents the frequency; and the ordinate, the amplitude, a frequency spectrum waveform is obtained.

The signal representing the frequency spectrum waveform and output from the detector 213 is input to a VBW filter 214.

This VBW filter 214 is constituted by a low-pass filter (LPF) for removing high-frequency components (noise components) from a frequency spectrum waveform 218 finally displayed on a display unit 217 attached to a front panel 219 of a spectrum analyzer like the one shown in FIG. 20.

A peak detector 215 detects the peak value of the analog frequency spectrum waveform output from the VBW filter 214 at each position on the time axis, thereby obtaining a final frequency spectrum waveform 218 having undergone envelope detection.

The signal indicating the final frequency spectrum waveform is converted into digital data by an A/D converter 216.

The frequency spectrum waveform converted into the digital data is displayed on the display unit 217 of the front panel 219.

As shown in FIG. 20, the frequency spectrum waveform 218 of the signal a is displayed on the display unit 217 of the front panel 219.

The frequency spectrum in a wide frequency range and an arbitrary frequency range can be measured changing the sweep frequency range and the frequency display range on the display unit 217.

In addition, by changing the bandwidth (RBW) of the RBW filter 210, the frequency resolution of the spectrum analyzer can be changed to an arbitrary value.

The following problems to be solved are also posed in the spectrum analyzer shown in FIG. 18.

The bandwidth (RBW) of the RBW filter 210 which indicates the frequency resolution of the spectrum analyzer and the passband center frequency $f_C$ must be adjusted, and calibration processes must be performed with respect to the linearity of logarithmic conversion in the LOG converter 212, amplitude deviations caused by switching of the bandwidth (RBW) of the RBW filter 210, and tuning deviations with respect to the sweep frequency range of the bandwidth (RBW).

Especially in the RBW filter 210 of the conventional spectrum analyzer, steep characteristics are obtained by cascade connection of a plurality of filters, and hence higher precision is required.

As described above, in the spectrum analyzer for executing frequency analysis processing for an RF signal by using analog electronic parts, cumbersome calibration must be performed at the start of actual measurement. For this reason, the measurement efficiency may greatly deteriorate.

Even if adjustment and calibration are completed before the start of measurement, the characteristics of the respective parts may vary in accordance with changes in measurement environment. High measurement precision may not therefore be obtained.

BRIEF SUMMARY OF THE INVENTION

The present invention has been made in consideration of the above situation, and has as its first object to provide a radio communication analyzer which allows simple and easy system modification to cope with a plurality of types of digital communication systems.

It is the second object of the present invention to provide a radio communication analyzer which realizes high-speed, easy supply of software to a plurality of modules, and ensures easy system modification and system expandability.

In addition, the present invention has been made in consideration of the problems in the above conventional spectrum analyzer, and has as its third object to provide a radio communication analyzer which can omit cumbersome adjustment and calibration processes at the start of measurement, and greatly reduce the operation load on the operator by digitally processing an IF signal output from a frequency converter, and can maintain a high measurement precision even if the measurement environment changes.

According to the first aspect of the present invention, there is provided a radio communication analyzer capable of testing a radio device under test which corresponds to one of a plurality of types of digital communication systems in accordance with the digital communication system to which the radio device under test corresponds, comprising: modulation means, having a first rewritable memory, for converting modulation data indicating contents of a first test signal to be transmitted to the radio device under test into a digital modulated signal by executing a program written in the first memory; demodulation means, having a second rewritable memory, for generating demodulated data from a second test signal received from the radio device under test by executing a program written in the second memory; modulation/demodulation processing means, having a third rewritable memory, for generating data to be input to said modulation means and processing the demodulated data obtained by said demodulation means based on a protocol for the digital communication system used by the radio device under test by executing a program written in the third memory; and control means for reading out program data corresponding to the respective types of digital communication systems from a storage unit and writing the data in the first, second, and third memories.

According to the second aspect of the present invention, there is provided an analyzer according to claim 1, wherein said control means comprises a main module having a memory, and at least one of said modulation means and said demodulation means comprises a sub-module having a memory, said main module includes the memory of said sub-module as part of a self-memory space, and writes the program in the memory of said sub-module in a setting operation for said sub-module, and said sub-module includes digital signal processing means for processing a test signal form the radio device under test to receive and analyze the test signal, and processes the test signal in accordance with the program stored in the memory. According to the third aspect of the present invention, there is provided an analyzer according to claim 2, further comprising: a first address decoder for using the memory of said sub-module as part of the self-memory space of said main module; a second address decoder for using the memory of said sub-module as a self-memory space of said sub-module; and switching means for connecting an address of the memory of said sub-module to said first address decoder in a setting operation for said sub-module, and connecting an address of the memory of said sub-module to said second address decoder during execution of said sub-module.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a block diagram showing an example of the overall arrangement of a radio communication analyzer according to the first embodiment of the present invention;

FIG. 3 is a block diagram showing an analyzer system setting operation in the radio communication analyzer according to the first embodiment;

FIG. 4 is a block diagram showing a transmitting operation in the radio communication analyzer according to the first embodiment;

FIG. 7 is a block diagram showing an example of the overall arrangement of a radio communication analyzer according to the second embodiment of the present invention;

FIG. 8 is a view showing the memory space in the radio communication analyzer according to the second embodiment;

FIG. 9 is a block diagram showing the arrangements of the main and sub-modules of the radio communication analyzer according to the second embodiment;

FIG. 10 is a flow chart for explaining a system setting operation for each sub-module according to the second embodiment;

FIG. 11 is a block diagram showing an example of the arrangement of a sub-module used as a modulation section in a radio communication analyzer according to the third embodiment of the present invention;

FIG. 12 is a block diagram showing an example of the arrangement of a sub-module used as a demodulation/analysis section in a radio communication analyzer according to the fourth embodiment of the present invention;

FIG. 14 is a block diagram showing processing sections formed in a DSP incorporated in the radio communication analyzer having the spectrum analyzer function;

FIGS. 15A to 15D are block diagrams showing the schematic arrangement of the RBW digital filter incorporated in the radio communication analyzer having the spectrum analyzer function and, graphs showing input-output characteristics of the RBW digital filter;

DETAILED DESCRIPTION OF THE INVENTION

Figures 1B, 1C:
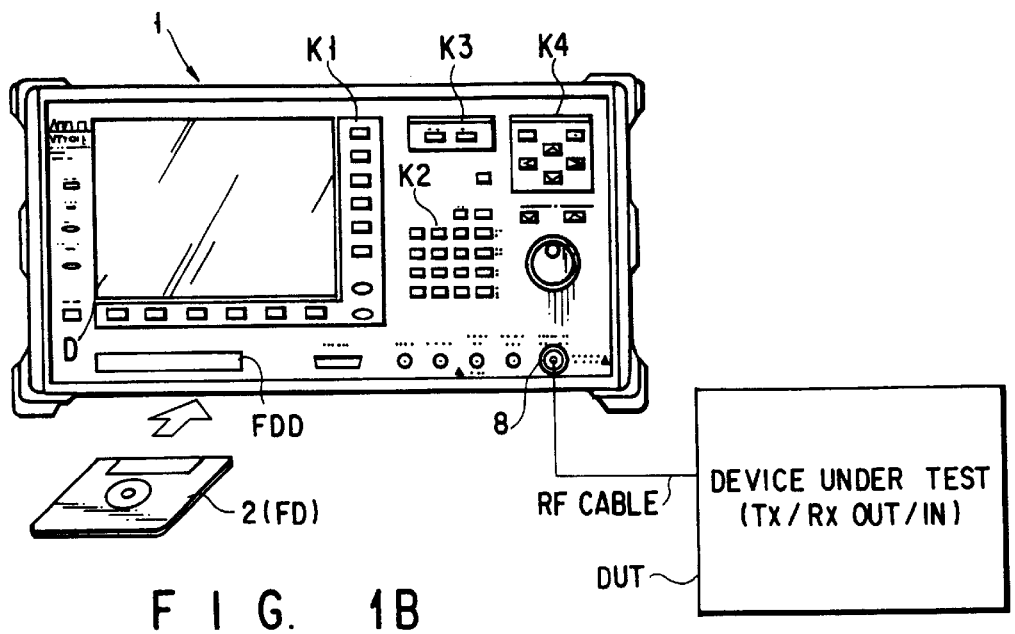
FIG. 1B is a view showing the relationship in connection between the panel of the radio communication analyzer to which the first embodiment of the present invention is applied and a radio device under test.
FIG. 1C is a view showing examples of the specifications of radio devices under test which use various types of digital communication systems and are to be measured by the radio communication analyzer to which the first embodiment of the present invention is applied.

Reference will now be made in detail to the presently preferred embodiments of the invention as illustrated in the accompanying drawings, in which like reference characters designate like or corresponding parts throughout the several drawings.

The embodiments of the present invention will be described below.

(First Embodiment)

FIG. 1A is a block diagram showing an example of the overall arrangement of a radio communication analyzer according to the first embodiment of the present invention.

This radio communication analyzer is constituted by a display/input section 1, a storage unit 2, a control section 3, a modulation/demodulation data processing section 4, a modulation section 5, a demodulation/analysis section 6, a wideband RF/IF section 7, and an RF input/output terminal 8.

The display/input section 1 consists of a display unit and an input unit. The display/input section 1 displays output information from the control section 3, and is also used by the operator of the radio communication analyzer to input instructions to the control section 3.

The storage unit 2 stores various information and programs for causing the control section 3 to read out or download data. The storage unit 2 is used to store programs for allowing the modulation/demodulation data processing section 4, the modalation section 5 and the demodulation/analysis section 6 to process signals including, e.g., digital filter information used in the modulation section 5, in correspondence with various types of digital communication systems, together with test signal information, test results, and the like as the various information and programs.

The control section 3 controls the modulation/demodulation data processing section 4, the modulation section 5, the demodulation/analysis section 6, and the wideband RF/IF section 7 when a test signal is transmitted or received. Upon analyzer system setting, the control section 3 transfers programs read out or downloaded from the storage unit 2 to first, second, and third RAMs 4a, 5a, and 6a of the modulation section 5, the demodulation/analysis section 6, and the modulation/demodulation data processing section 4, and changes (also replaces) the programs to allow the respective sections to have functions suited for a target digital communication system, thereby performing system setting for the radio communication analyzer in accordance with the digital communication system.

The modulation/demodulation data processing section 4 converts a transmission signal input from the control section 3 into digital modulation data, and transmits it to the modulation section 5. The modulation/demodulation data processing section 4 also performs baseband processing for demodulated data from the demodulation/analysis section 6, and outputs the resultant data to the control section 3.

In system setting for the radio communication analyzer, a conversion pattern to modulated data is set in the modulation/demodulation data processing section 4 in accordance with the programs from the control section 3.

The modulation section 5 modulates the modulation data from the modulation/demodulation data processing section 4 by using a digital filter, converts the digital data into analog data, and outputs the data to the wideband RF/IF section 7.

In system setting for the radio communication analyzer, the modulation section 5 is programmed by programs from the control section 3 to perform modulation processing and digital filter data generation processing.

When the digital filter is to be changed, the modulation section 5 receives new digital filter characteristic information from the control section 3, and executes digital filter data generation processing.

The demodulation/analysis section 6 performs A/D conversion of a received signal, and executes demodulation processing or analysis processing.

In system setting for the radio communication analyzer, the demodulation/analysis section 6 is programmed by a program from the control section 3 to perform demodulation processing or analysis processing.

The wideband RF/IF section 7 converts a test signal received through the RF input/output terminal 8 into an IF signal, and outputs the signal to the demodulation/analysis section 6. The wideband RF/IF section 7 also converts a test signal input from the modulation section 5 into an RF signal, and outputs it from the RF input/output terminal 8.

This wideband RF/IF section 7 can handle high-frequency signals throughout a wide band up to about 3 GHz to cope with various types of digital communication systems.

FIG. 1B shows the relationship in connection between the panel of the radio communication analyzer of the first embodiment of the present invention and a radio device under test.

A display section D as the display/input section 1, various input operation keypads K1, K2, K3, and K4, and the like are arranged on the panel surface of the radio communication analyzer. If the storage unit 2 is a floppy disk (FD), an FD driver FDD into which the FD is loaded is also mounted in the radio communication analyzer, together with the RF input/output terminal 8.

A radio device DUT under test is connected to the RF input/output terminal 8 through an RF cable.

The input operation keypad K1 is operated to select a predetermined function corresponding to one of a plurality of function keys (e.g., F1 to F12) on the display screen of the display section D.

The input operation keypad K2 is operated to input various measurement parameters.

The input operation keypad K3 is operated to select a single measurement or consecutive measurements.

The input operation keypad K4 is operated to move the cursor on the display screen of the display section D and open/close a parameter setting window on the display screen of the display section D.

FIG. 1C shows sample specifications of a radio device under test which uses various digital communication systems to be measured by the radio communication analyzer according to the first embodiment of the present invention.

In this case, the radio bands, communication methods, time-division channel (ch), modulation methods, transmission rates, and frame periods are shown as specifications concerning PDC, PHS, and GSM of the protocols used by various digital communication systems.

More detailed examples of the arrangements of the respective sections shown in FIG. 1A will be described next.

Figure 2:
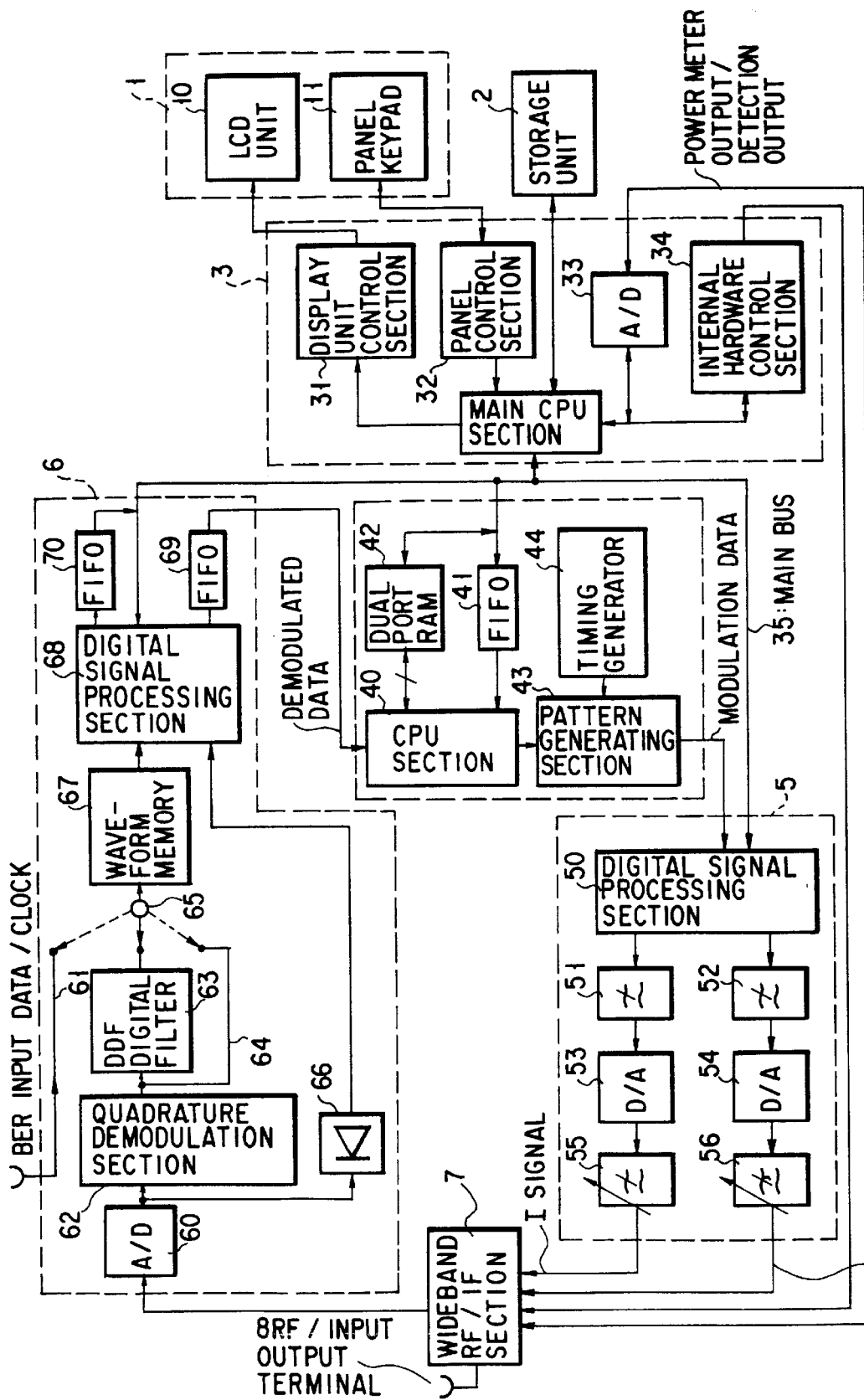
FIG. 2 is a block diagram showing an example of the detailed arrangement of the first embodiment.

FIG. 2 is a block diagram showing a detailed example of the arrangement of this embodiment.

Referring to FIG. 2, the display/input section 1 is constituted by a liquid crystal display (LCD) unit 10 as a display unit and a panel keypad 11 as an input unit.

The storage unit (storage medium) 2 is a memory card, a floppy disk, or the like when it is to be externally mounted. When the corresponding data is to be changed internally, the storage unit 2 is another type of storage unit, e.g., a hard disk or ROM.

The control section 3 is constituted by a main CPU section 30, a display unit control section 31 for controlling the display operation of the display unit 10, a panel control section 32 for controlling the input/output operation of the panel keypad 11, an A/D converter 33 for performing A/D conversion of an analog signal such as a power meter output from the wideband RF/IF section 7 or a detection output, and an internal hardware control section 34 for controlling the wideband RF/IF section 7.

The main CPU section 30 includes a work memory, and is connected to the modulation/demodulation data processing section 4, the modulation section 5, and the demodulation/analysis section 6 through a main bus 35.

In system setting for the radio communication analyzer, the main CPU section 30 transfers software programs read out from the storage unit 2 to the modulation/demodulation data processing section 4, the modulation section 5, and the demodulation/analysis section 6, together with filter information. In addition, the main CPU section 30 controls the respective sections during test measurement, and transfers the test data.

The modulation/demodulation data processing section 4 is constituted by a CPU section 40, a FIFO memory 41 for loading programs, a dual port RAM 42 for communication, a pattern generating section 43, and a timing generator 44 for providing a pattern generation timing for the pattern generating section 43.

The CPU section 40 has a work memory (the third RAM 4a), and can operate based on the digital communication protocol used by the radio device under test in demodulation in accordance with a program supplied from the control section 3.

With this operation, a demodulated signal from the demodulation/analysis section 6 is processed on the basis of a predetermined protocol, and the resultant signal is sent to the control section 3.

The CPU section 40 also programs the pattern generating section 43 in accordance with software supplied from the control section 3, and outputs transmission data from the control section 3 to the pattern generating section 43.

The pattern generating section 43 is constituted by a programmable gate array such as an FPGA. The pattern generating section 43 generates various patterns such as a PN pattern and a fixed pattern as modulation data in accordance with programs, and outputs the data to the modulation section 5.

The modulation section 5 has a digital signal processing section 50, digital filters 51 and 52 for performing modulation processing for modulation data from the modulation/demodulation data processing section 4, D/A converters 53 and 54 for performing D/A conversion of the modulated signal having undergone the modulation processing, and analog filters 55 and 56 for removing high-frequency components from the D/A conversion outputs.

The digital filter 51, the D/A converter 53, and the analog filter 55 process the inphase component to output an I signal. The digital filter 52, the D/A converter 54, and the analog filter 56 process the quadrature component to output a Q signal.

The digital signal processing section 50 includes a DSP (Digital Signal Processor) and a work memory (the first RAM 5a). In system setting for the radio communication analyzer, a modulation processing means and a table data generation means which correspond to a digital communication system under test are programmed as the operation of the DSP by the control section 3.

The above modulation processing means is a means for converting modulation data from the modulation/demodulation data processing section 4 into a digital signal by using the digital filters 51 and 52.

The table data generation means is a means for generating table data to be stored in the digital filters 51 and 52 on the basis of filter characteristics designated by the control section 3.

The digital filters 51 and 52 are constituted by rewritable storage means such as RAMs, and designed to store baseband filter information generated by a DSP operation as digital filter information.

Note that the filter characteristics are set in accordance with the test conditions or requirements in each test.

The analog filter 55 has variable characteristics and hence can cope with a change in transmission rate and the like.

The demodulation/analysis section 6 is constituted by an A/D converter 60 for performing A/D conversion of an IF signal, a BER measurement signal line 61, a quadrature demodulation section 62, a digital filter 63, an analysis signal line 64, a signal switching section 65 for selecting one of signals from the BER measurement signal line 61, the digital filter 63, and the analysis signal line 64, a peak detector 66 for performing peak detection and outputting the resultant data to the digital signal processing section 68, a waveform memory 67 for buffering waveform information, a digital signal processing section 68, a FIFO memory 69 for demodulation data, and a FIFO memory 70 for storing analysis information.

The digital signal processing section 68 includes a DSP (Digital Signal Processor) and a work memory (the second RAM 6a). In system setting for the radio communication analyzer, a demodulation processing means and an analysing means which correspond to a digital communication system under test are programmed as the operation of the DSP by the control section 3.

This demodulation processing means operates when the demodulation mode is selected by the display/input section 1.

In this case, the signal switching section 65 selects one of signals from the digital filter 63, demodulates the waveform signal in accordance with the program, and outputs the demodulated data to the modulation/demodulation data processing section 4 through the FIFO memory 69.

The analyzing means operates when the analysis mode is selected by the display/input section 1.

In this case, the DSP can execute a plurality of types of analyses. Some new functions can be added to the corresponding program from the storage unit 2 or the contents can be changed by changing the program through the control section 3.

For example, the analyzing functions of this DSP include a spectrum analyzer function, a modulation analyzing function, a BER measurement function, and a peak detection function. These functions can be executed by setting DSP programs.

In this case, the signal switching section 65 selects a signal corresponding to the type of analysis to be performed, and the analyzing means outputs the analysis result to the control section 3 through the FIFO memory 70 or the main bus.

The wideband RF/IF section 7 and the RF input/output terminal 8 are designed to transmit or receive RF signals in a wide band so as to cope with various types of digital communication systems.

Although not specifically shown, the wideband RF/IF section 7 and the RF input/output terminal 8 can handle various types of modulated signals such as a π/4 DQPSK signal, a BPSK signal, and an AM signal.

The operation of the radio communication analyzer according to the first embodiment of the present invention will be described next.

System setting for the radio communication analyzer in accordance with a digital communication system to be measured and tested by the radio communication analyzer will be described first with reference to FIG. 3.

FIG. 3 is a block diagram for explaining system setting for the radio communication analyzer of this embodiment.

First of all, the operator designates a method for the digital communication system, e.g., PHS, PDC, or GSM as shown in FIG. 1C, a modulation pattern, the type of demodulation/analysis, and the like, and selectively inputs the corresponding data through the display/input section 1 (step S1).

The control section 3 reads out programs corresponding to the selectively input method from the storage unit 2 (step S2), and transfers them to the modulation/demodulation data processing section 4, the modulation section 5, and the demodulation/analysis section 6 (steps S3, S4, and S5).

The modulation/demodulation data processing section 4, the modulation section 5 respectively store the DSP, table, CPU, and FPGA programs and table information, and are set to perform digital signal processing in accordance with the designated communication method.

In measurement, the digital table characteristics of the modulation section 5 are changed or the type of analysis is changed, as needed (steps S1, S2, S6, and S7).

The transmitting operation to be performed when this radio communication analyzer transmits a test signal to the digital communication system under test will be described next with reference to FIG. 4.

FIG. 4 is a block diagram for explaining the transmitting operation performed by the radio communication analyzer of this embodiment.

First of all, a test signal to be transmitted is designated through the display/input section 1 (step S11).

The control section 3 then sends the information of the designated test signal, i.e., the transmission data, to the modulation/demodulation data processing section 4 (step S13).

If the digital filter characteristics of the modulation section 5 need to be changed before this operation, the filter characteristics are changed in the above manner (step S6).

The modulation/demodulation data processing section 4 processes the transmission data as modulation data, and outputs it to the modulation section 5 (step S14).

The modulation data is modulated by the digital filter and the DSP in the modulation section 5 in the digital form used by the radio device under test. The modulated data is converted into an analog signal. High-frequency components are removed from the analog signal. The resultant signal is then input to the wideband RF/IF section 7 (step S15).

The wideband RF/IF section 7 outputs an RF signal RF from the RF input/output terminal 8 to the radio device under test (step S16).

The demodulating operation to be performed when the radio communication analyzer receives a radio signal and demodulates it will be described with reference to FIG. 5.

Figure 5:
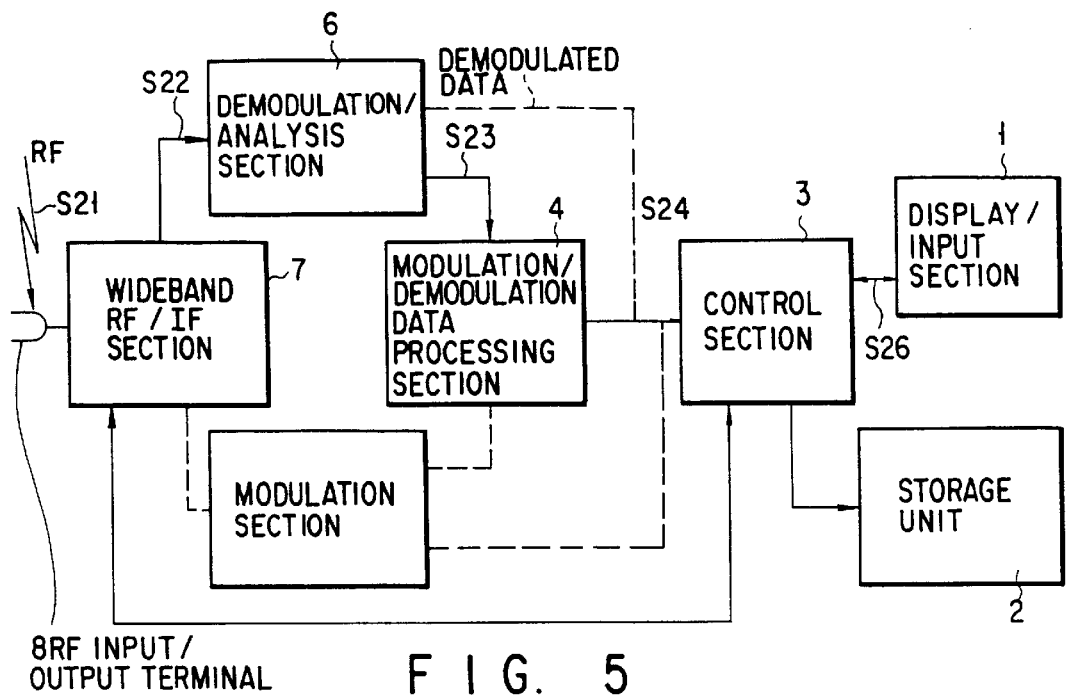
FIG. 5 is a block diagram showing a demodulating operation in the radio communication analyzer according to the first embodiment.

FIG. 5 is a block diagram for explaining demodulation performed by the radio communication analyzer of this embodiment.

First of all, the RF signal RF received from the radio device under test (step S21) is converted into an IF signal by the wideband RF/IF section 7, and the IF signal is input to the demodulation/analysis section 6 (step S22).

The demodulation/analysis section 6 converts this signal into digital data. The digital data is demodulated by the operation of the DSP and is input as demodulated data to the modulation/demodulation data processing section 4 (step S23).

The modulation/demodulation data processing section 4 processes the demodulated data on the basis of the protocol of the digital communication system used by the radio device under test, and inputs the obtained data as reception data to the control section 3 (step S24).

Note that the demodulated data is processed by the modulation/demodulation data processing section 4 to ensure high-speed demodulation.

The control section 3 then displays the reception data from the modulation/demodulation data processing section 4 on the display/input section 1 (step S26).

The analysing operation to be performed when the radio communication analyzer of this embodiment receives a radio signal and analyzes the reception signal will also be described with reference to FIG. 6.

Figure 6:
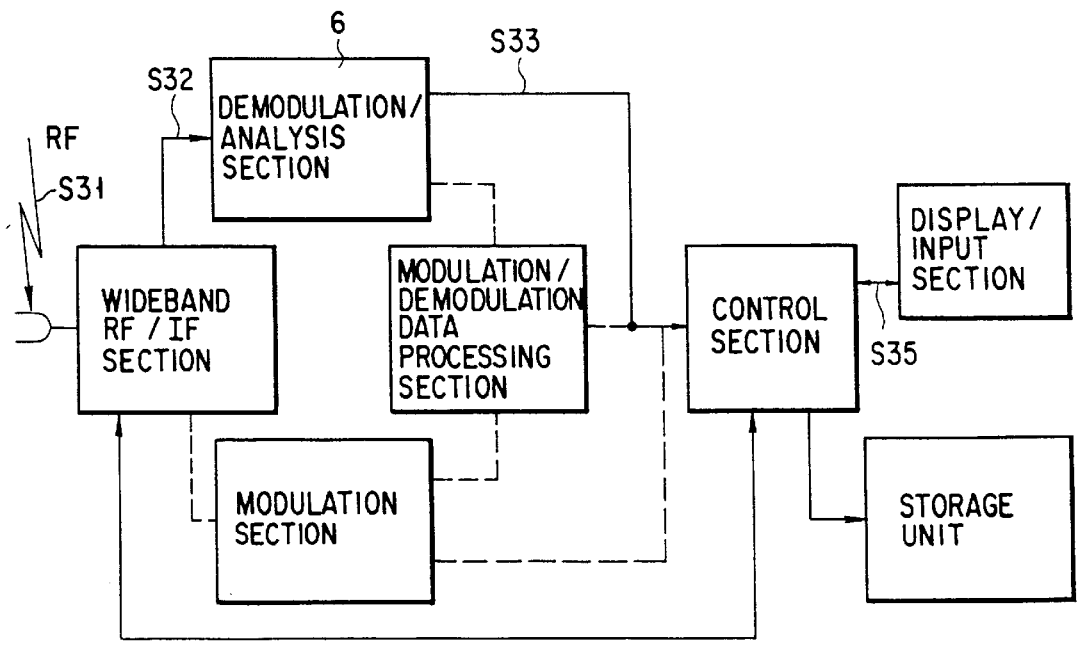
FIG. 6 is a block diagram showing an analyzing operation in the radio communication analyzer according to the first embodiment.

FIG. 6 is a block diagram for explaining the analyzing operation of the radio communication analyzer according to this embodiment.

An RF signal RF received from the radio device under test (step S31) is converted into an IF signal by the wideband RF/IF section 7 and, the IF signal is input to the demodulation/analysis section 6 (step S32).

In the demodulation/analysis section 6, this IF signal is converted into digital data, and the programmed analyzing operation is executed by the DSP to analyze the frequency deviation, rise/fall characteristics, antenna power deviation, time alignment, carrier-off interval leakage power, a modulation precision, occupied bandwidth, adjacent channel leakage power, and the like. The analysis results are then input to the control section 3 (step S33).

The control section 3 displays the analysis results on the display/input section 1 (step S35).

As described above, the radio communication analyzer according to the first embodiment of the present invention has the digital signal processing means with the rewritable memory means in the modulation/demodulation data processing section 4, the modulation section 5, and the demodulation/analysis section 6, and the corresponding programs are changed in accordance with digital signal systems and digital processing types. Therefore, system modification to cope with a plurality of types of digital communication systems can be easily and simply realized.

In addition, the radio communication analyzer according to the first embodiment of the present invention can easily change the type of digital filter to be used, switch the demodulation/analysis modes, and change the type of analysis to be performed, the type of modulation pattern to be used, and the like.

According to the present invention, therefore, there is no need to use a plurality of types of radio communication analyzers for the respective communication systems or replace hardware for each communication system as in the prior art.

In addition, according to the present invention, since the control section 3 reads out the above programs and the like from the storage unit 2 and transfers them to the respective sections, a further improvement in flexibility can be attained, and easy, reliable function modifications can be realized.

(Second Embodiment)

A radio communication analyzer which is constituted by a plurality of modules and can easily supply software programs to the respective modules at high speed will be described below as the second embodiment of the present invention.

The radio communication analyzer according to the second embodiment provides a means for realizing the radio communication analyzer of the first embodiment.

FIG. 7 is a block diagram showing the arrangement of the main part of the radio communication analyzer according to the second embodiment of the present invention.

As shown in FIG. 7, in this radio communication analyzer, a first sub-module 91, a second sub-module 92, and a third sub-module 93 are connected to a main module 90, which is connected to an external storage unit 94, through a bus 95.

Although the following description is based on the arrangement in which the three sub-modules are connected to the main module, the number of sub-modules which can be connected to the main module is not limited in the present invention.

In this case, the main module 90 has its own processing function and a function of performing overall control of the respective sub-modules 91, 92, and 93.

The sub-modules 91, 92, and 93 execute predeterined processes (to be described later) in accordance with software programs supplied from the external storage unit 94 through the main module 90.

FIG. 8 shows the memory spaces of the main module 90 and the sub-modules 91, 92, and 93.

FIG. 8 shows the memory spaces arranged in the radio communication analyzer of this embodiment.

As shown in FIG. 8, a main module program space A90 and sub-module program spaces A91, A92, and A93 are arranged in a main module memory space MA as the entire memory space which the main module 90 can access.

The main module program space A90 is a memory area used by the main module 90 to execute its own operation after system setting is completed in the radio communication analyzer.

The sub-module program spaces A91, A92, and A93 are memory areas which are recognized as accessible memory areas by the main module 90 and are used by the sub-modules 91, 92, and 93 to execute their own processes.

The more detailed arrangement of the radio communication analyzer including the main module 90 and the sub-modules 91, 92, and 93 having the memory spaces A90, A91, A92, and A93 will be described with reference to FIG. 9.

FIG. 9 is a block diagram showing the arrangements of the main module and the sub-modules in the radio communication analyzer of this embodiment.

As shown in FIG. 9, the main module 90 is constituted by a CPU 102, an address decoder 103, a RAM/ROM 104, a reset circuit 105, an external storage unit interface 106, and a bus buffer 107, which are connected to an internal bus 101, and other peripheral elements (not shown).

The CPU 102 controls the operation of the main module 90 in accordance with programs in the RAM/ROM 104.

The address decoder 103 is connected to the RAM/ROM 104, the reset circuit 105, the external storage unit interface 106, and the bus buffer 107 through signal lines l104, l105, l106, and l107, respectively.

The address decoder 103 detects an address which the CPU 102 is to access, and outputs a select signal to the device corresponding to the designated address to set it in the ON state.

The RAM/ROM 104 is a memory element having an address space corresponding to the main module program space A90. The RAM/ROM 104 is used for the operation of the main module 90.

The reset circuit 105 is activated to output a reset signal or inactivated to stop outputting the reset signal in accordance with an instruction from the CPU 102.

The external storage unit interface 106 is used to read out designated information from the external storage unit 94.

The bus buffer 107 is connected to the bus 95, and servers as a bus driving buffer used to transfer data to any one of the sub-modules 91, 92, and 93 through the bus 95.

In each of the sub-modules 91, 92, and 93, a DSP 112 and an internal address decoder 113 are connected to an internal bus 111, and a RAM 115 is also connected to the internal bus 111 through a switch 114.

In each of the sub-modules 91, 92, and 93, an external address decoder 116 is connected to the bus 95, and the bus 95 is connected to the RAM 115 through the switch 114.

The signal lines l113 and l116 to which select signals from the internal address decoder 113 and the external address decoder 116 are output are connected to a switch 117, and one of the signal lines is connected to the signal line l115 connected to the RAM 115.

The DSP 112 performs digital signal processing in the sub-module and operates in accordance with a program in the RAM 115 or using data therein.

This DSP is connected to the reset circuit 105 of the main module through the signal line l105, and is set in the reset state upon reception of a reset signal.

The internal address decoder 113 detects an address which the DSP 112 is to access, and outputs a select signal to the device corresponding to the designated address to set it in the ON state.

For example, in the first sub-module 91, the address designated by the DSP 112 is an address in the first sub-module program space in FIG. 8.

The switches 114 and 117 are connected to the reset circuit 105 of the main module through the signal line l105, and designed to connect the RAM 115 to the bus 95 and the signal line l116 on the external address decoder side upon reception of a reset signal.

When the reset signal is disabled, the switches 114 and 117 connect the RAM 115 to the internal bus 111 and the signal line l113 on the internal address decoder side.

The RAM 115 is used to store programs for operating the DSP 112 and data used for processing, and is also used as a work area for DSP operations.

Note that programs and the like are transferred from the main module 90 through the bus 95.

For example, in the first sub-module 91, the RAM 115 is a memory element having an address space corresponding to the first sub-module program space A91 in FIG. 8.

The external address decoder 116 detects an address which the CPU 102 of the main module 90 is to access through the bus 95, and outputs a select signal to the device corresponding to the designated address to set it in the ON state.

While a reset signal is output from the reset circuit 105 of the main module 90, the external address decoder 116 is active. While the reset signal is disabled, the internal address decoder 113 is active.

In the second or third sub-module 92 or 93, the address space of the RAM 115 corresponds to the second or third sub-module program space A92 or A93 in FIG. 8.

System setting for the radio communication analyzer of this embodiment, which has the above arrangement, will be described next with reference to FIG. 10. In this operation, software programs used by the respective sub-modules are transferred thereto.

FIG. 10 is a flow chart for explaining the system setting operation for the respective sub-modules in this embodiment.

First of all, in transferring designated data to the corresponding sub-modules, the CPU 102 of the main module 90 activates the reset circuit 105 to output a reset signal (step S41).

In response to the reset signal, the DSP 112 in each of the sub-modules 91, 92, and 93 is reset, and the RAM 115 is connected to the bus 95 through the switches 114 and 117 to receive a select signal for the external address decoder 116 (step S42).

The CPU 102 of the main module 90 then reads out data to be transferred from the external storage unit 94 (step S43).

The CPU 102 starts to transmit the data read out from the external storage unit 94 to one of the sub-module program spaces A91, A92, and A93 assigned as the main module memory space MA (step S44).

A case wherein the data is transferred to the first sub-module 91 will be described below.

In this case, since the address designated by the CPU 102 corresponds to an address in the first sub-module program space A91, the bus buffer 107 is selected by the address decoder 103, and address information, transfer data, and the like are sent to the first sub-module 91 through the bus 95.

In the first sub-module 91, when the address is designated through the bus 95, a select signal is output from the external address decoder 116 to the RAM 115 (step S45).

The data read out from the external storage unit 94 is transferred and written in the selected RAM 115 (step S46).

When the transfer of the data to the first sub-module 91 is complete, the CPU 102 inactivates the reset circuit 105 to stop outputting the reset signal (step S47).

With this operation, the switches 114 and 117 are switched to connect the RAM 115 to the internal bus 111 and receive a select signal for the internal address decoder 113.

Subsequently, the operation of the DSP 112 is resumed, and the RAM 115 is accessed by only the DSP 112. Therefore, the first sub-module 91 becomes independent of the main module 90.

Digital signal processing is performed on the basis of the program transferred and stored in the RAM 115 in this manner (step S48).

As described above, in the radio communication analyzer of this embodiment, the DSPs 112 and the RAMs 115 are arranged in the sub-modules 91, 92, and 93, and the memory space of the main module 90 includes the memory spaces of the sub-modules to directly write setting information for each sub-module in the RAM 115. With this arrangement, software programs can be easily supplied to a plurality of modules at high speed, and easy system modifications and system expandability can be ensured.

According to this embodiment, therefore, even an installed software program can be changed without replacing the program ROM incorporated in the apparatus, unlike the conventional apparatus, and a plurality of applications can be selectively executed by only replacing an external storage medium as in a personal computer.

In addition, according to this embodiment, the main module 90 can set the sub-modules by directly writing corresponding programs in the self-memory space, and hence can execute data transfer at high speed. Furthermore, the use of an external storage unit with a short access time can greatly shorten the software load time.

Moreover, according to the present invention, the reset circuit 105, the switches 114 and 117, the internal address decoder 113, and the external address decoder 116 are arranged such that the RAM 115 is disconnected from the internal bus when data is to be transferred from the main module, and the RAM is disconnected from the bus 95 when a sub-module is to operate. With this arrangement, reliable data transfer to each sub-module and the reliable, accurate operation of each sub-module can be ensured.

(Third Embodiment)

According to the third embodiment, the radio communication analyzer of the first embodiment is realized by using the arrangement of the main part of the radio communication analyzer of the second embodiment. An example of the arrangement of this embodiment in which a control section 3 and a modulation section 5 correspond to the main module 90 and the sub-module 91, respectively, will be described below.

FIG. 11 is a block diagram showing an example of the arrangement of a sub-module used as a modulation section in a radio communication analyzer according to the third embodiment of the present invention.

The same reference numerals in FIG. 11 denote the same parts as in FIGS. 1A, 2, and 9, and only different portions will be described below.

Referring to FIG. 11, the modulation section 5 is formed as one sub-module having the same arrangement as that of the sub-modules 91, 92, and 93 described in the second embodiment with reference to FIG. 9 except that an external interface 118 and a D/A converter 119 are connected to an internal bus 111, and a variable analog filter 120 is used to remove high-frequency components from an analog modulated signal from the D/A converter 119.

In the modulation section 5 shown in FIG. 11, programs and data like those described in the second embodiment are transferred from the control section 3, and a reset circuit 105 is set inactive.

A RAM 115 (corresponding to the first RAM 5a in FIG. 1A) has therefore been connected to the internal bus 111 and an internal address decoder 113.

The internal address decoder 113 is connected to the external interface 118 and the D/A converter 119 through signal lines 1118 and 1119, respectively, and outputs a select signal thereto.

In addition, a modulation processing program 121 for realizing a modulation processing means and a table data generation program 122 for realizing a table data generation means have already been transferred to the RAM 115.

A DSP 112 executes modulation processing and table data generation processing in accordance with these programs.

Note that the table data generation program 122 has a frequency characteristic generation portion, a correction value generation portion, an inverse Fourier transform portion, and a convolution processing portion.

The operation of the radio communication analyzer according to this embodiment, which has the above arrangement, will be described next.

First of all, programs and filter characteristic information are transferred from the control section 3 through a bus 95 and stored in the RAM 115.

This operation is the same as that in the second embodiment.

An analog filter switching signal is input from the control section 3 to the variable analog filter 120 to set the analog filter characteristic as part of the filter characteristics.

The DSP 112 processes the filter characteristic information in accordance with the transferred table data generation program to generate a filter table 123 serving as a digital filter for executing baseband filter processing. This table is stored in the RAM 115.

The control section 3 then outputs transmission data serving as a test signal to a modulation/demodulation data processing section 4. The modulation data generated by the modulation/demodulation data processing section 4 is input to the modulation section 5 through the external interface 118.

The input modulation data is converted into a digital modulated signal by the operation of the DSP 112 based on the modulation processing program 121 using the filter table 123 serving as a digital filter. The modulated signal is then input to the D/A converter 119.

The digital modulated signal is converted into an analog signal by the D/A converter 119. The variable analog filter 120 then removes high-frequency components from the analog signal. The resultant signal is output as an analog demodulated signal to a wideband RF/IF section 7.

As described above, according to the radio communication analyzer of this embodiment of the present invention, the modulation processing program 121 and the table data generation program 122 are transferred to the sub-module having the DSP 112 and the RAM 115 to allow the sub-module to operate as the modulation section 5. Therefore, the same effects as those in each embodiment described can be obtained.

In addition, if the modulation/demodulation data processing section 4 and the demodulation/analysis section 6 shown in FIGS. 1A and 2 are formed in the same manner as the modulation section 5 in FIG. 11, a radio communication analyzer with high expandability and flexibility which can change its processing contents can be realized.

(Fourth Embodiment)

FIG. 12 is a block diagram showing the arrangement of a sub-module used as a demodulation/analysis section 6 in a radio communication analyzer according to the fourth embodiment of the present invention.

The same reference numerals in FIG. 12 denote the same parts as in FIGS. 1A, 2, and 9, and only different portions will be described below.

Referring to FIG. 12, the demodulation/analysis section 6 is formed as one sub-module having the same arrangement as that of the sub-modules 91, 92, and 93 described in the second embodiment with reference to FIG. 9 except that a quadrature demodulator 62, a DDF digital filter 63, a waveform memory 67, and an output interface 133 are connected to an internal bus 121, and a switch 65 is used to select BER data from a radio device under test, a clock input, and the output signal from the DDF digital filter 63.

Programs and data like those in the second embodiment are transferred to the demodulation/analysis section 6 in FIG. 12, and a reset circuit 105 is set inactive.

A RAM 134 (corresponding to the second RAM 6a in FIG. 1A) has therefore been connected to the internal bus 121 and an internal address decoder 123.

The internal address decoder 123 is connected to the quadrature demodulator 129, the DDF digital filter 63, the waveform memory 67, and the output interface 133 through signal lines 1123, 1124, 1125, and 1126, respectively, and outputs a select signal thereto.

A hardware setting program 135, a demodulation program 136, a modulation analysis program 137, and a BER measurement program 138 have already been transferred to the RAM 134. The hardware setting program 135 serves to realize operation setting for the quadrature demodulator 62 and the DDF digital filter 63. The demodulation program 136 serves to realize demodulation based on the digital modulation method used by the radio device under test. The modulation analysis program 137 serves to realize modulation analysis based on the digital modulation method used by the radio device under test. The BER measurement program 138 serves to realize BER measurement in the radio device under test by receiving BER data and a clock signal from the radio device under test.

As processing mode designation data 139, a value corresponding to one of demodulation processing, modulation analysis processing, and BER measurement processing is written by the control section 3.

Upon execution of the hardware setting program 135, a DSP 68 executes demodulation processing, modulation analysis processing, or BER measurement processing by executing the program corresponding to the value of the processing mode designation data 139.

The operation of the radio communication analyzer according to this embodiment, which has the above arrangement, will be described next.

First of all, programs are transferred from the control section 3 through a bus 95 and stored in the RAM 134.

This operation is the same as in the second embodiment.

The control section 3 then writes a value corresponding to one of demodulation processing, modulation analysis processing, and BER measurement processing as the processing mode designation data 139.

When a control line 1105 for a reset signal is inactivated by the control section 3, the hardware setting program 135 is executed by the DSP 68.

When the value of the processing mode designation data 139 corresponds to demodulation processing or modulation analysis processing, parameters required to convert digital modulation data from the radio device under test into I/Q baseband data are set in the quadrature demodulator 62 and the DDF digital filter 63.

In this case, the switch 65 is set to input the output signal from the DDF digital filter 63 to the waveform memory 67.

If the value of the processing mode designation data 139 corresponds to BER measurement processing, the switch 65 is set to input BER data and a clock from the radio device under test to the waveform memory 67.

If the value of the processing mode designation data 139 corresponds to demodulation processing after the execution of the hardware setting program 135, the DSP 68 executes the demodulation program 136.

With this operation, the I/Q baseband data in the waveform memory 67 is demodulated into digital data having logic levels "1" and "0" on the basis of the digital modulation method used by the radio device under test.

The demodulated data is input to the modulation/demodulation data processing section 4 through the output interface 133.

If the value of the processing mode designation data 139 corresponds to modulation analysis processing after the execution of the hardware setting program 135, the DSP 65 executes the modulation analysis program 137.

With this operation, the I/Q baseband data in the waveform memory 67 is analyzed on the basis of the digital modulation method used by the radio device under test.

The analysis result is input to the control section 3 through the output interface 133 and displayed on an LCD unit 10.

If the value of the processing mode designation data 139 corresponds to BER measurement processing after the execution of the hardware setting program 135, the BER measurement program 138 is executed.

With this operation, the BER data in the waveform memory 67 is sampled at the change points of the BER clock in the waveform memory 67 and converted into a data string.

The sampled data string is collated with a BER network data string transmitted to the radio device under test to calculate a BER.

The calculated BER measurement result is input to the control section 3 through the output interface 133 and displayed on the LCD unit 10.

In the radio communication analyzer of each embodiment described above, predetermined setting/processing operations are executed by the modulation/demodulation data processing section 4, the modulation section 5, and the demodulation/analysis section 6 constituted by, for example, the above modules in accordance with the programs corresponding to the respective digital communication systems (PDC, PHS, and GSM) which are read out or downloaded from the storage unit (storage medium) and transferred from the control section 3.

The predetermined setting/processing operations executed by the modulation/demodulation data processing section 4, the modulation section 5, and the demodulation/analysis section 6 in accordance with the programs corresponding to the respective digital communication systems (PDC, PHS, and GSM) will be described in the form of a table in the order of PDC, PHS, and GSM. (PDC) Modulation/Demodulation Data Processing Section 4:
Modulation Data Processing A pattern generating section 43 generates a data pattern based on the PDC standards at a transmission rate of 42.0 kbps and a frame period of 20 ms.

Demodulation Data Processing

Demodulated data from the demodulation/analysis section 6 is sent to the control section 3 on the basis of the communication protocol for PDC (data from the demodulation/analysis section 6, which is broken up into a plurality of slots, are synthesized on the basis of the protocol for PDC).

Modulation Section 5:
Generation of Table Data for Baseband Filter

The characteristics of a baseband filter (root Nyquist filter characteristics represented by a=0.5 in PDC) used by PDC are calculated by the DSP 122 and set in the digital filters 51 and 52.

Modulation Processing

The modulation processing program 121 is executed by the DSP in the digital signal processing section 50 to perform π/4DQPSK modulation processing used by PDC with respect to the modulation data from the modulation/demodulation data processing section 4, and the resultant data is sent to the digital filters 51 and 52.

Variable Analog Filter Cutoff Frequency Setting

Characteristics that cut off noise in the sampling frequency used by the radio communication analyzer for PDC in the modulation section 5 are set in the analog filters 55 and 56 by the control section 3.

Demodulation/Analysis Section 6:
Hardware Setting In Demodulation/Analysis Section The hardware setting program 135 is used to make settings for the quadrature demodulator 62 and the DDF digital filter 63 to convert π/4DQPSK modulated waves transmitted at a transmission rate of 42.0 kbps into I and Q baseband signals.

Demodulation Processing

The demodulation program 136 is used to demodulate π/4DQPSK I and Q signals, each having a PDC slot format, into digital signals consisting of "1" and "0". The digital signals are sent to the modulation/demodulation data processing section 4.

Analysis Processing

The modulation analysis program 137 is used to modulation/analyze π/4DQPSK I and Q signals, each having a PDC slot format. The resultant data are sent to the control section 3.

BER Measurement Processing

The BER measurement program 138 is used to calculate the error rate of BER data transmitted from a radio device under test at a transmission rate of 42.0 kbps. The result is sent to the control section 3. (PHS)

Modulation/Demodulation Data Processing Section 4:
Modulation Data Processing

The pattern generating section 43 generates a data pattern based on the PHS standards at a transmission rate of 384.0 kbps and a frame period of 5 ms.

Demodulation Data Processing

Demodulated data from the demodulation/analysis section 6 is sent to the control section 3 on the basis of the communication protocol for PHS (data from the demodulation/analysis section 6, which is broken up into a plurality of slots, are synthesized on the basis of the protocol for PHS).

Modulation Section 5:
Generation of Table Data for Baseband Filter

The characteristics of a baseband filter (root Nyquist filter characteristics represented by α=0.5 in PDC) used by PHS are calculated by the DSP 122 and set in the digital filters 51 and 52.

Modulation Processing

The modulation processing program 121 is executed by the DSP in the digital signal processing section 50 to perform π/4DQPSK modulation processing used by PHS with respect to the modulation data from the modulation/demodulation data processing section 4, and the resultant data is sent to the digital filters 51 and 52.

Variable Analog Filter Cutoff Frequency Setting

Characteristics that cut off noise in the sampling frequency used by the radio communication analyzer for PHS in the modulation section 5 are set in the analog filters 55 and 56 by the control section 3.

Demodulation/Analysis Section 6:
Hardware Setting in Demodulation/Analysis Section The hardware setting program 135 is used to make settings for the quadrature demodulator 62 and the DDE digital filter 63 to convert π/4DQPSK modulated waves transmitted at a transmission rate of 384.0 kbps into I and Q baseband signals.

Demodulation Processing

The demodulation program 136 is used to demodulate π/4DQPSK I and Q signals, each having a PHS slot format, into digital signals consisting of "1" and "0". The digital signals are sent to the modulation/demodulation data processing section 4.

Analysis Processing

The modulation analysis program 137 is used to modulation/analyze π/4DQPSK I and Q signals, each having a PHS slot format. The resultant data are sent to the control section 3.

BER Measurement Processing

The BER measurement program 138 is used to calculate the error rate of BER data transmitted from a radio device under test at a transmission rate of 384.0 kbps. The result is sent to the control section 3. (GSM)

Modulation/Demodulation Data Processing Section 4:
Modulation Data Processing

A pattern generating section 43 is to generate a data pattern based on the GSM standards at a transmission rate of 270.833 kbps and a frame period of 4.615 ms.

Demodulation Data Processing

Demodulated data from the demodulation/analysis section 6 is sent to the control section 3 on the basis of the communication protocol for GSM (data from the demodulation/analysis section 6, which is broken up into a plurality of slots, are synthesized on the basis of the protocol for GSM).

Modulation Section 5:
Generation of Table Data for Baseband Filter

The characteristics of a baseband filter (a Gaussian filter with BbT=0.3 in GSM) used by GSM are calculated by the DSP 122 and set in the digital filters 51 and 52.

Modulation Processing

The modulation processing program 121 is executed by the DSP in the digital signal processing section 50 to perform GMSK modulation processing used by GSM with respect to the modulated data from the modulation/demodulation data processing section 4, and the resultant data is sent to the digital filters 51 and 52.

Variable Analog Filter Cutoff Frequency setting

Characteristics that cut off noise in the sampling frequency used by the radio communication analyzer for GSM in the modulation section 5 are set in the analog filters 55 and 56 by the control section 3.

Demodulation/Analysis Section 6:
Hardware Setting in Demodulation,/Analysis Section The hardware setting program 135 is used to make settings for the quadrature demodulator 62 and the DDF digital filter 63 to convert GMSK modulated waves transmitted at a transmission rate of 273.844 kbps into I and Q baseband signals.

Demodulation Processing

The demodulation program 136 is used to demodulate GMSK I and Q signals, each having a GSM slot format, into digital signals consisting of "1" and "0". The digital signals are sent to the modulation/demodulation data processing section 4.

Analysis Processing

The modulation analysis program 137 is used to modulation/analyze GMSK I and Q signals, each having a GSM slot format. The resultant data are sent to the control section 3.

BER Measurement Processing

According to GSM, unlike PDC and PHS, after an RF signal from a radio device under test is demodulated, data divided into slots are synthesized, and the error rate of the synthesized data is calculated (the switch 65 in FIG. 12 selects the output from the DDF digital filter). The BER measurement program 138 in GSM is a program obtained by adding a slot synthesizing procedure to the demodulation program 136 and the BER measurement program 138 in PDC and PHS. The measured error rate is sent to the control section 3 as in PDC and PHS.

As described in detail above, according to the first to fourth embodiments, there is provided a radio communication analyzer which allows simple and easy system modifications to cope with a plurality of types of digital communication systems.

In addition, according to the first to fourth embodiments, there is provided a radio communication analyzer which can supply software programs to a plurality of modules easily and simply, and can ensure easy system modifications and system expandability.

(Fifth Embodiment)

A radio communication analyzer having a spectrum analyzer function according to the fifth embodiment of the present invention will be described next with reference to the accompanying drawing.

Figure 13:
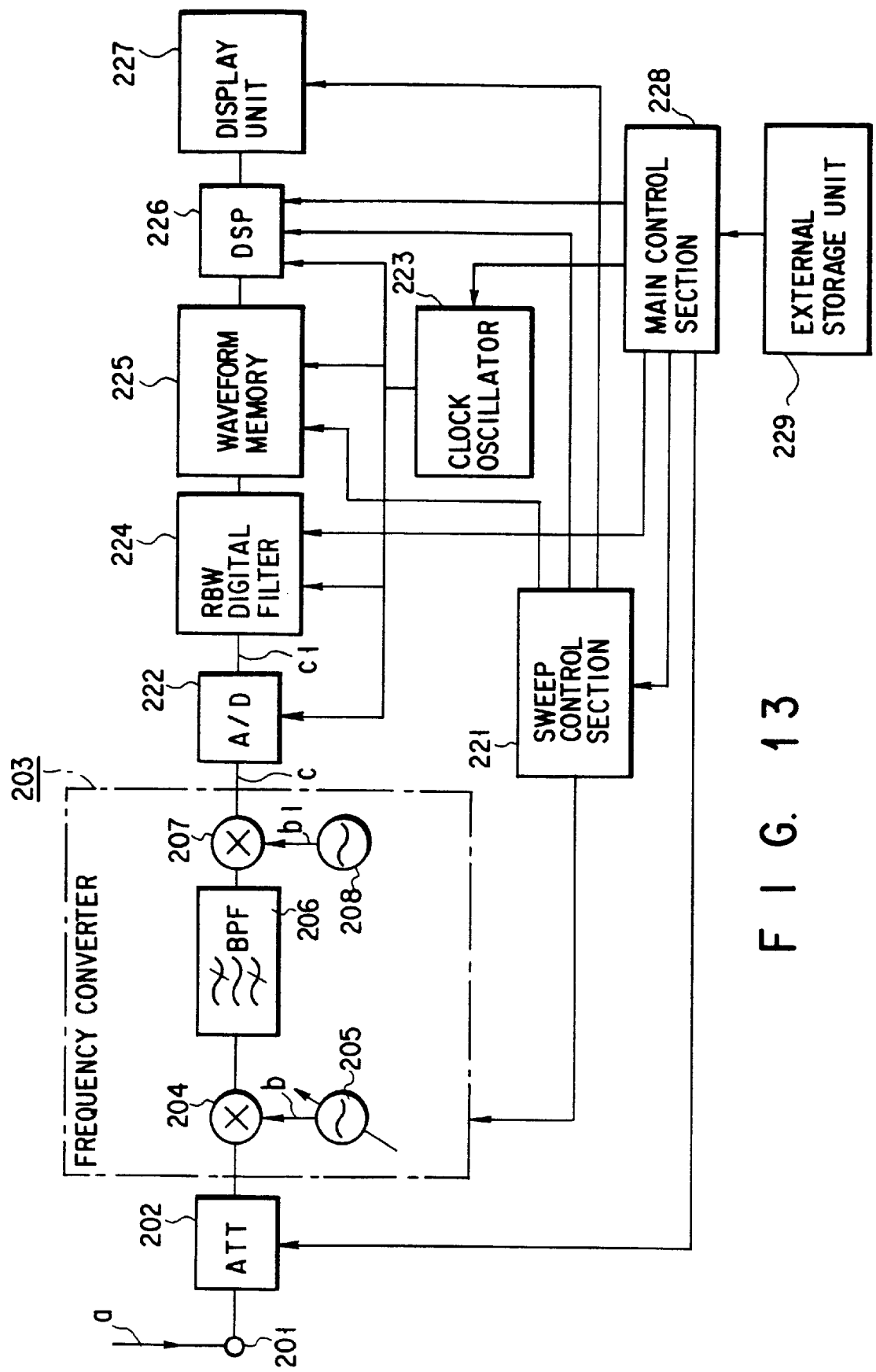
FIG. 13 is a block diagram showing the schematic arrangement of a radio communication analyzer having a spectrum analyzer function according to the fifth embodiment of the present invention.

FIG. 13 is a block diagram showing the schematic arrangement of the radio communication analyzer having the spectrum analyzer function according to this embodiment.

Figure 18:
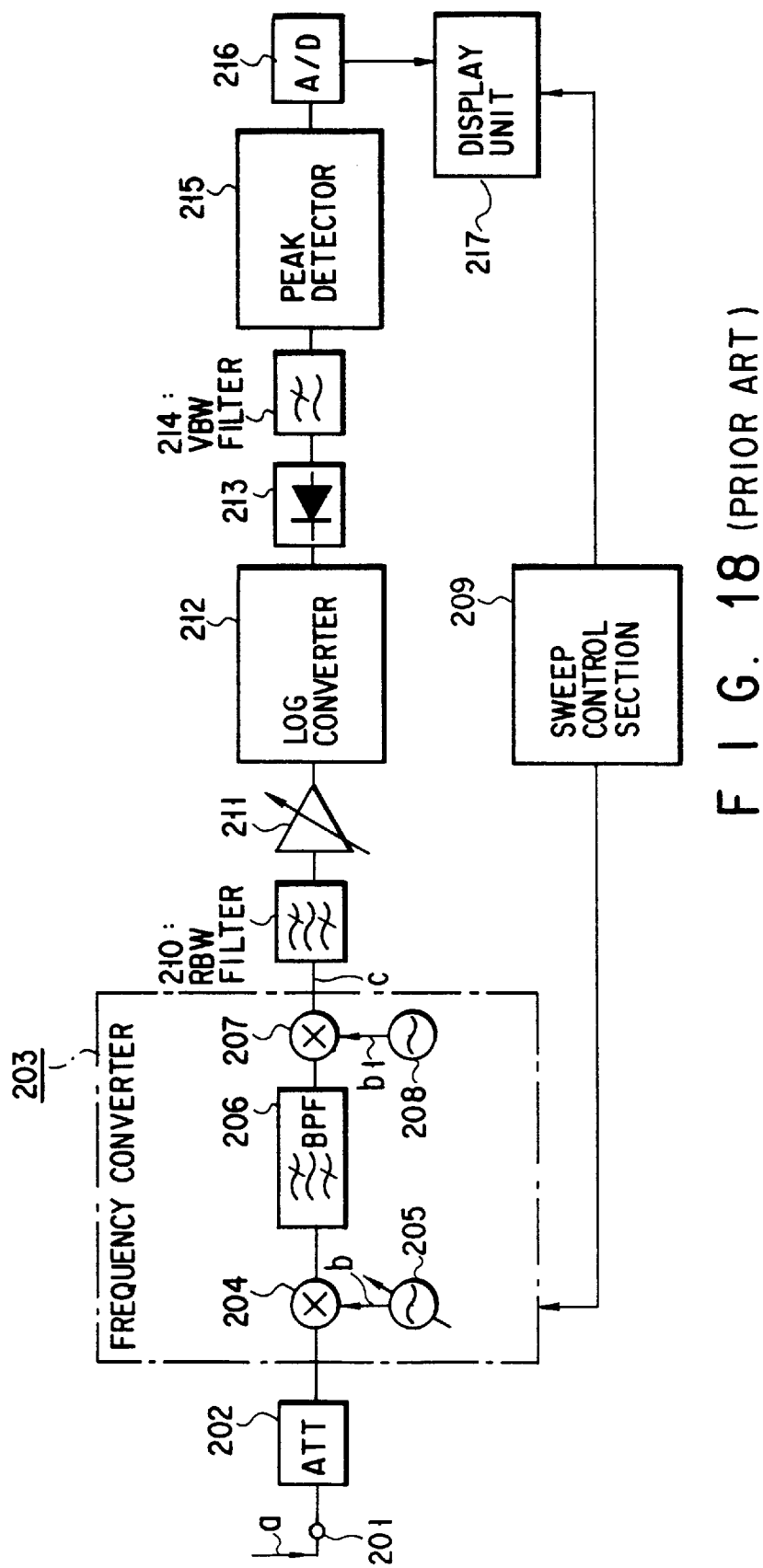
FIG. 18 is a block diagram showing the schematic arrangement of a conventional spectrum analyzer constituted by analog electronic parts.

The same reference numerals in FIG. 13 denote the same parts as in FIG. 18 showing the conventional spectrum analyzer.

A detailed description of the part common to the analyzers shown in FIGS. 13 and 18 will be omitted.

Referring to FIG. 13, an analog RF signal a to be tested which has a frequency of several hundred kHz to several GHz and input through an input terminal 201 is adjusted to a predetermined level by an attenuator 202, and input to a frequency converter 203.

The RF signal a input to the frequency converter 203 is synthesized with a local oscillation signal b from a local oscillator 205 by a signal mixer 204 to be converted into an IF signal having an intermediate frequency.

This IF signal is band-limited by a BPF 206. The resultant signal is synthesized with a local oscillation signal $b_1$ from a local oscillator 208 again by a signal mixer 207. The synthesized signal is output as an IF signal c from the frequency converter 203.

The oscillation frequency of the local oscillator 205 in the frequency converter 203 is swept throughout a predetermined frequency range by a sweep control section 221.

As a result, a frequency $f_I$ of the IF signal c output from the frequency converter 203 also changes in synchronism with the sweeping operation.

The IF signal c having the frequency $f_I$ decreased to, e.g., 6 MHz is sampled by an A/D converter 222 using a sampling signal having a sampling frequency $f_S$ of, e.g., 30 MHz and output from a clock oscillator 233. The sampled signal is a digital IF signal $c_1$ having, e.g., a 12-bit format.

This digital IF signal c1 is input to an RBW digital filter 224 on the next stage.

For example, the RBW digital filter 224 is constituted by a decimation digital filter which can decrease the sampling frequency while executing digital filtering and, a down-converter which can convert the digital IF signal $c_1$ into the baseband.

Figure 15D:
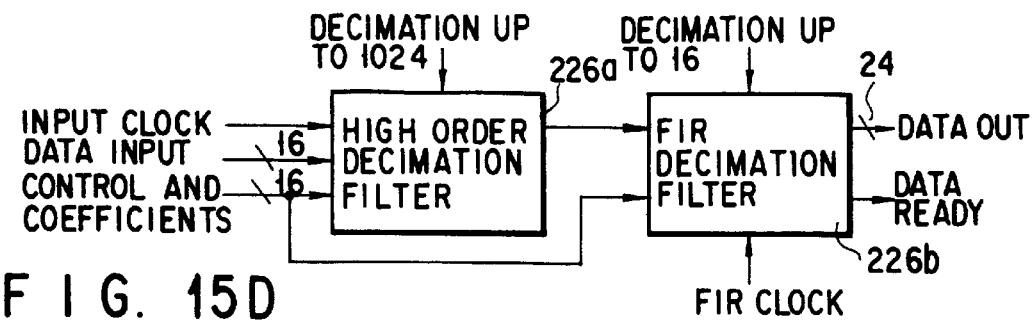

This RBW digital filter may be realized by commercially available device including a numerically controlled oscillator/modulator 226A and decimation digital filters 226B and 226C as shown in FIGS. 15A and 15B which can available from HARRIS semiconductor company, e.g., the numerically controlled oscillator/demodulator HSP45116 constituted by a phase/frequency control section 226D, a sine/cosine section 226D and a CMAC 226F as shown in FIG. 15C and, the decimation digital filter HSP43220 constituted by a high order decimation filter (HDF) 226A and a FIR decimation filter 226B as shown in FIG. 15D, or by software processing.

Figure 19:
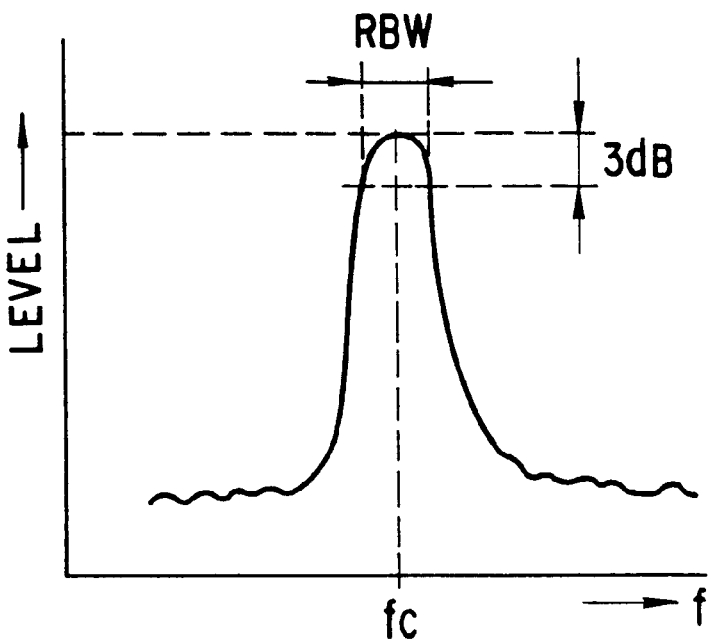
FIG. 19 is a graph showing the frequency characteristics of a general RBW filter.
Figure 20:
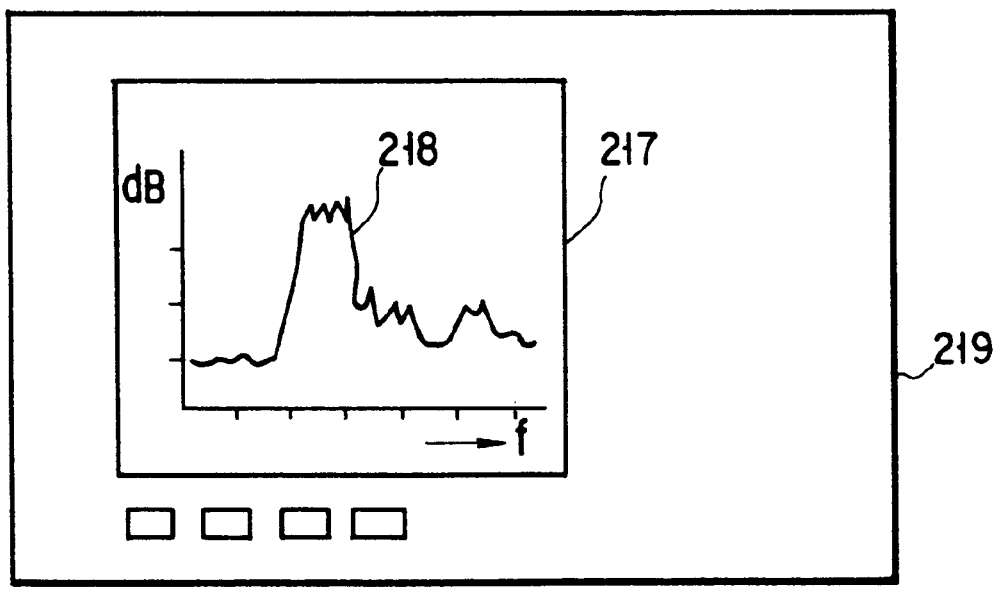
FIG. 20 is a view showing a general frequency spectrum waveform displayed on the display unit of the conventional spectrum analyzer.

The RBW digital filter 224 has frequency characteristics approximating those of an RBW filter 210. As indicated by the frequency characteristics in FIG. 19, the RBW digital filter 224 has a function of transmitting frequency components within a bandwidth (RBW) corresponding to the frequency resolution of the spectrum analyzer which is centered on a predetermined center frequency $f_C$.

This bandwidth (RBW) can be changed to an arbitrary RBW value by changing the calculation coefficient value of the filter.

The RBW digital filter 224 removes unnecessary components from the frequency $f_I$ of an IF signal $c_2$ output from a frequency converter 3 and converted into a digital signal by the A/D converter 222. The resultant data becomes a time series waveform to be output with the lapse of time.

The time series waveform output from the RBW digital filter 224 is temporarily stored in a memory 225. Thereafter, the waveform is input to a DSP 226.

This DSP 226 is constituted by a kind of ultra-compact high-speed calculation module.

For example, calculation processing programs transferred by an external storage unit 229 such as an HDD are written and stored in the DSP 226 in advance by a main control section 228.

The DSP 226 executes a plurality of types of calculation processes in accordance with the written processing programs.

Figure 16:
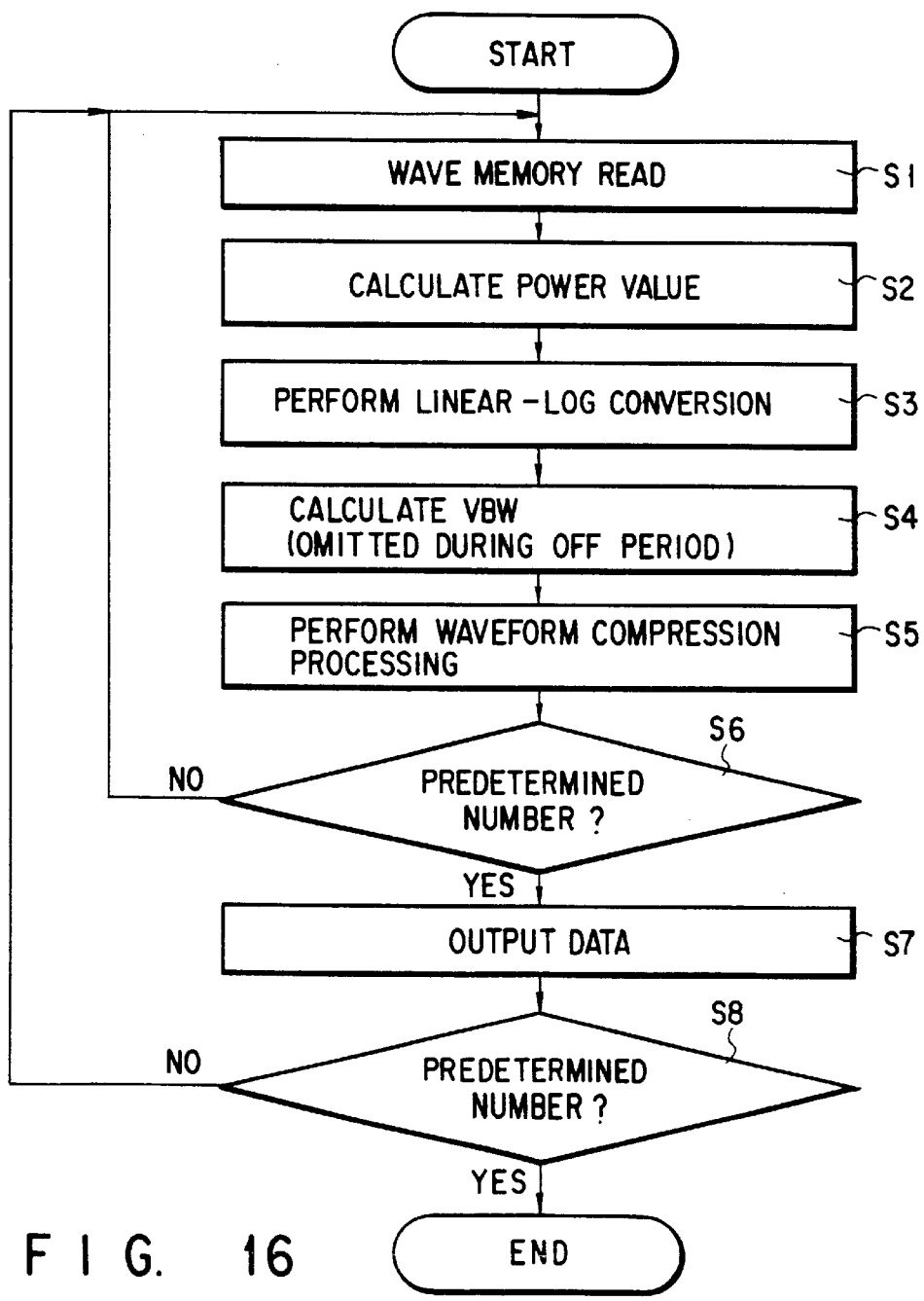
FIG. 16 is a flow chart showing a procedure for executing a calculation program stored in the DSP incorporated in the radio communication analyzer having the spectrum analyzer function.
Figure 17A:
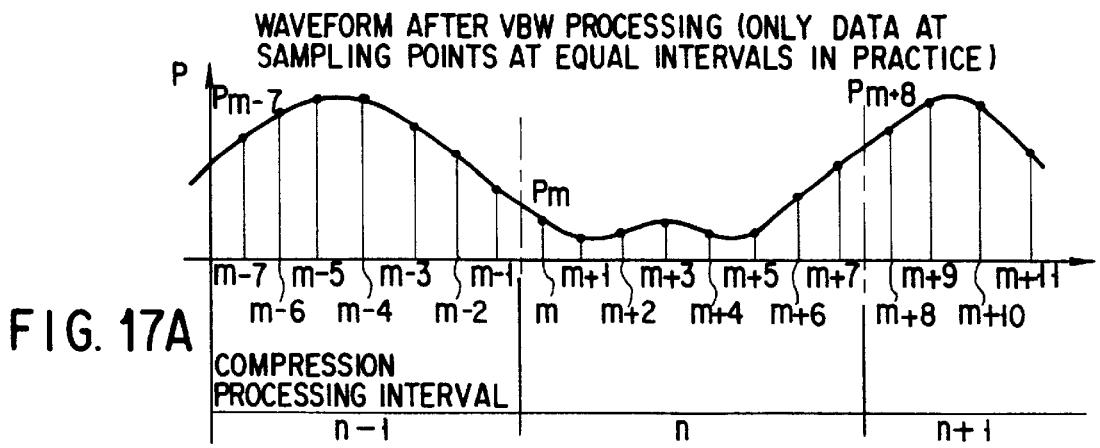
FIGS. 17A to 17D are graphs showing examples of waveform compression processing performed by the DSP incorporated in the radio communication analyzer having the spectrum analyzer function.
Figure 17B:
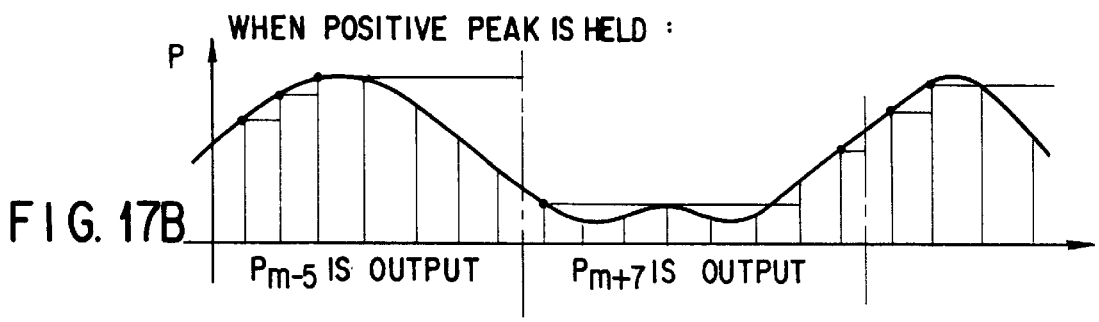
Figure 17C:
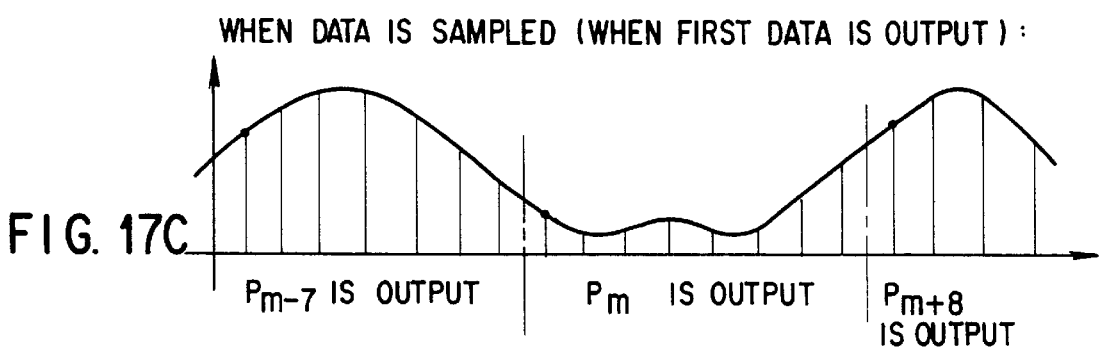
Figure 17D:
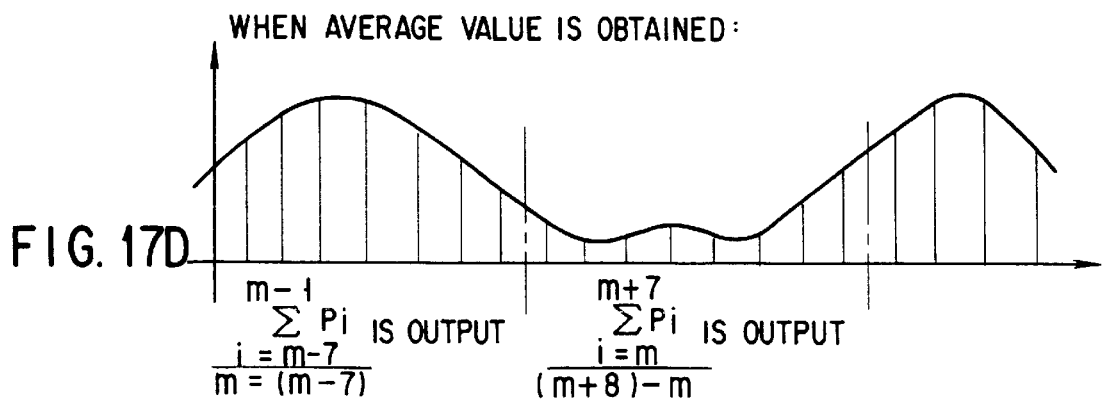

By executing the calculation processing programs stored in the DSP 226 as indicated by the flow chart of FIG. 16, a detection processing section 250, a LOG conversion processing section 251, a VBW filter processing section 252, and a waveform compression processing section 253 shown in FIG. 14 are implemented functionally.

As indicated by the flow chart shown in FIG. 16, the DSP 226 reads out waveform data from the memory 225 (step S1), and calculates the power value (step S2). In addition, the DSP 226 performs Linear-Log conversion (step S3), and calculates the VBW (step S4; this step is omitted in the OFF state). Thereafter, the DSP 226 performs waveform compression processing (step S5). If it is determined that a predetermined number of data are detected (step S6), the detected data are output (step S7). If it is determined that the predetermined number of data are output, the processing is terminated.

The operations of the detection processing section 250, the LOG conversion processing section 251, the VBW filter processing section 252, and the waveform compression processing section 253 will be sequentially described next.

The detection processing section 250 reads out time series waveform data from the waveform memory, and performs absolute value conversion of the time series waveform data. The detection processing section 250 then outputs the resultant data as a detection waveform indicating an amplitude to the LOG conversion processing section 251.

For example, the LOG conversion processing section 251 is constituted by a conversion table in which values obtained by logarithmic conversion of data values which are expected to be input are stored in advance. Conversion values (dB: decibel) corresponding to the data values of sequentially input waveforms are read out from the LOG conversion processing section 251 to be output.

A time series waveform output from the LOG conversion processing section 251 is therefore a frequency spectrum waveform with the abscissa indicating the frequency and the ordinate indicating the magnitude in decibel.

The frequency spectrum waveform data output from the LOG conversion processing section 251 is input to the VBW filter processing section 252 on the next stage.

For example, the VBW filter processing section 252 is constituted by an infinite impulse response filter (IIR filter) which is a kind of linear digital filter.

The VBW filter processing section 252 functions as a LPF (Low-Pass Filter) for removing high-frequency components from a frequency spectrum waveform, similar to an analog VBW filter 214 in FIG. 18.

The frequency spectrum waveform data output from the VBW filter processing section 252 is output to the waveform compression processing section 253.

The waveform data output from the VBW filter processing section 252 requires a high sampling frequency, and all the waveform data in the sweep frequency range cannot be displayed on a display unit 227.

The waveform compression processing section 253 extracts data at a position corresponding to the display unit 227 on the time axis from the waveform data output from the VBW filter processing section 252 and requiring a high sampling frequency.

As a technique of extracting such data, one of the following methods may be used: simple decimation in time like the one shown in FIGS. 17A to 17D, a technique of extracting a peak value from the waveform data corresponding to the time-axis position, a technique of obtaining the average value of the waveform data corresponding to the time-axis position, and the like.

The technique of obtaining the average value can be used when the waveform compression processing section 253 is implemented by software which is a characteristic feature of the present invention.

By using this average value, the noise level can be lowered without using a small VBW filter.

The waveform compression processing section 253 starts operating upon reception of a start signal from the sweep control section 221.

When the sweep control section 221 sweeps the local oscillator 205 of the frequency converter 203, a sweep signal is obtained. This signal is subjected to VBW digital filter processing and input to the waveform compression section with a considerable delay after it is subjected to A/D conversion, RBW digital, RBW digital filter processing, and various calculation processes.

The sweep control section 221 notifies the waveform compression processing section 253 of the start of sweep processing a predetermined period of time after the start of the processing.

Since a signal response delay occurs at the VBW digital filter, the waveform data obtained immediately after the start of the filter processing does not necessarily indicate the correct result. For this reason, the sweep control section 221 does not perform sweeping for a certain period of time after VBW digital filter processing is started, i.e., the DSP 226 is started.

The frequency spectrum waveform data output from the waveform compression processing section 253 is input to the display unit 227.

For example, the display unit 227 comprising a CRT unit, a liquid crystal display unit, or the like displays the received frequency spectrum waveform.

The main control section 228 has a function of outputting a sweep range setting instruction to the sweep control section 221, as well as a function of writing processing programs in the DSP 226.

The sweep control section 221 sweeps the local oscillation signal b in the frequency converter 203 within the frequency range designated by the main control section 228.

The main control section 228 notifies the DSP 226 of the bandwidth (RBW) of the RBW digital filter 224 corresponding to the sweep range, and the DSP 226 sets the RBW digital filter 224.

The sweep control section 221 sets the frequency display range on the display unit 227.

With this setting, therefore, the frequency spectrum of the signal a in a wide, arbitrary frequency range can be measured.

In the spectrum analyzer having the above arrangement, the input analog RF signal a is converted into the IF signal c whose frequency $f_I$ is subjected to sweep control by the frequency converter 203.

The analog IF signal output from the frequency converter 203 is converted into the digital IF signal $c_1$ by the A/D converter 222.

The RBW digital filter 224 extracts frequency components in the bandwidth (RBW) corresponding to the frequency resolution from the digital IF signal $c_1$. The time series waveform data output from the RBW digital filter 224 is temporarily stored in the memory 225, and then input to the DSP 226.

The DSP 226 executes detection processing, LOG conversion processing, VEW filter processing, peak detection processing, and display editing processing with respect to the time series waveform data corresponding to one sweep period (sweep cycle) and stored in the memory 225 according. to a software technique, and displays the resultant frequency spectrum waveform on the display unit 227.

In this manner, in this embodiment, the IF signal c output from the frequency converter 203 is digitally processed to omit the corresponding analog electronic parts.

According to this embodiment, cumbersome adjustment and calibration processes performed for the respective analog electronic parts in the conventional apparatus shown in FIG. 18 prior to measurement can be omitted. Therefore, the operation load on the operator can be greatly reduced, and the measurement efficiency can be greatly improved.

According to this embodiment, even if the measurement environment such as temperature for the RBW digital filter 224, the memory 225, and the DSP 226 slightly varies, the calculation results rarely include errors. Therefore, the measurement precision can be greatly improved as compared with the conventional apparatus.

According to this embodiment, the passband and passband center frequency fc of the VBW filter incorporated as software in the RBW digital filter 224 and the DSP 226 can be easily changed by software.

According to this embodiment, therefore, the bandwidth (RBW) of the RBW digital filter 224 can be easily changed in accordance with the sweep range. For this reason, the frequency spectrum of the signal a in a wide, arbitrary frequency range can be measured.

In addition, according to this embodiment, digital data is processed at high speed by using the DSP 226 specially for calculation processing. Therefore, the frequency spectrum of the RF signal a can be analyzed almost in real time.

As has been described above, in the radio communication analyzer having the spectrum analyzer function according to this embodiment, an IF signal output from the frequency converter is converted into a digital IF signal by the A/D converter, and subsequent processes for obtaining a frequency spectrum waveform, e.g., a RBW filter process and a LOG conversion process for the IF signal are implemented by digital parts and software processes.

According to the radio communication analyzer having the spectrum analyzer function according to this embodiment. therefore, cumbersome adjustment and calibration processes prior to measurement can be omitted. For this reason, the operation load on the operator can be greatly reduced. In addition, even if the measurement environment changes, a high measurement precision can be maintained.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A radio communication analyzer capable of testing a radio device under test which corresponds to one of a plurality of types of digital communication systems in accordance with the digital communication system to which the radio device under test corresponds, comprising:

modulation means, having a first rewritable memory, for converting modulation data indicating contents of a first test signal to be transmitted to the radio device under test into a digital modulated signal by executing a program written in the first memory;

demodulation means, having a second rewritable memory, for generating demodulated data from a second test signal received from the radio device under test by executing a program written in the second memory;

modulation/demodulation processing means, having a third rewritable memory, for generating data to be input to said modulation means and processing the demodulated data obtained by said demodulation means based on a protocol for the digital communication system used by the radio device under test by executing a program written in the third memory; and control means for reading out program data corresponding to the respective types of digital communication systems from a storage unit and writing the data in the first, second, and third memories.

2. An analyzer according to claim 1, wherein said control means comprises a main module having a memory, and at least one of said modulation means and said demodulation means comprises a sub-module having a memory, said main module includes the memory of said sub-module as part of a self-memory space, and writes the program in the memory of said sub-module in a setting operation for said sub-module, and said sub-module includes digital signal processing means for processing a test signal form the radio device under test to receive and analyze the test signal, and processes the test signal in accordance with the program stored in the memory.

3. An analyzer according to claim 2, further comprising:

a first address decoder for using the memory of said sub-module as part of the self-memory space of said main module;

a second address decoder for using the memory of said sub-module as a self-memory space of said sub-module; and switching means for connecting an address of the memory of said sub-module to said first address decoder in a setting operation for said sub-module, and connecting an address of the memory of said sub-module to said second address decoder during execution of said sub-module.

4. An analyzer according to claim 1, wherein said storage unit comprises means for externally downloading the program.

5. An analyzer according to claim 1, wherein said storage unit comprises means for internally reading out the program.

6. An analyzer according to claim 1, wherein said modulation means comprises means, having a first RAM, for converting modulation data indicating contents of a test signal to be transmitted to the radio device under test into a digital modulated signal by executing a program stored in the first RAM.

7. An analyzer according to claim 6, wherein said demodulation means comprises demodulation/analysis processing means, having a second RAM, for performing A/D conversion of a test signal received from the radio device under test and also executing demodulated data generation or analysis processing by executing a program stored in the second RAM.

8. An analyzer according to claim 7, wherein said modulation/demodulation processing means comprises means, having a third RAM, for generating modulation data processed by said modulation processing means, and processing demodulated data obtained by said demodulation/analysis processing means based on a protocol for the digital communication system used by the radio device under test by executing a program stored in the third RAM.

9. An analyzer according to claim 8, wherein said storage unit comprises means for internally or externally changing or replacing programs stored in the first, second, and third RAMs in accordance with the plurality of types of digital communication systems.

10. An analyzer according to claim 8, wherein said control means comprises means for reading out programs corresponding to a desired digital communication system from said storage unit before the start of the test, and changing programs stored in said first, second, and third RAMs.

11. A method of testing a radio device under test which corresponds to one of a plurality of types of digital communication systems in accordance with the digital communication system to which the radio device under test corresponds, comprising the steps of:

converting modulation data indicating contents of a first test signal to be transmitted to the radio device under test into a digital modulated signal by executing a program written in a first rewritable memory;

generating demodulated data from a second test signal received from the radio device under test by executing a program written in a second rewritable memory;

generating the modulation data and processing the demodulated data on the basis of a protocol for the digital communication system used by the radio device under test by executing a program written in a third rewritable memory; and reading out data of programs corresponding to the respective types of digital communication systems from a storage unit and writing the data in the first, second, and third rewritable memories.

* * * * *

UNITED STATES PATENT AND TRADEMARK OFFICE
CERTIFICATE OF CORRECTION

PATENT NO.    : 6,243,576 B1
DATED         : June 5, 2001
INVENTOR(S)   : Takashi Seike et al.

It is certified that error appears in the above-identified patent and that said Letters Patent is hereby corrected as shown below:

<u>Title page,</u>
Item [56], References Cited, U.S. PATENT DOCUMENTS, insert
-- 5,566,088     10/1996          Herscher et al. --;
FOREIGN PATENT DOCUMENTS, insert
-- 63-67976     5/1988          Japan --.

Signed and Sealed this

Tenth Day of September, 2002

*Attest:*

*Attesting Officer*

JAMES E. ROGAN
*Director of the United States Patent and Trademark Office*